United States Patent
Freeman et al.

(10) Patent No.: US 12,241,976 B2
(45) Date of Patent: Mar. 4, 2025

(54) ONE BOAT NETWORK GROUPS AND METHODS OF IFTTT OPERATION THEREOF

(71) Applicants: Justin Freeman, Ball Ground, GA (US); Daniel Baston, Saint Peter, MN (US)

(72) Inventors: Justin Freeman, Ball Ground, GA (US); Daniel Baston, Saint Peter, MN (US)

(73) Assignee: Johnson Outdoors Inc., Racine, WI (US)

( * ) Notice: Subject to any disclaimer, the term of this patent is extended or adjusted under 35 U.S.C. 154(b) by 417 days.

(21) Appl. No.: 17/744,356

(22) Filed: May 13, 2022

(65) Prior Publication Data

US 2023/0367008 A1    Nov. 16, 2023

(51) Int. Cl.
  *G01S 15/96*    (2006.01)
  *A01K 79/00*    (2006.01)
  (Continued)

(52) U.S. Cl.
  CPC .............. *G01S 15/96* (2013.01); *A01K 79/00* (2013.01); *A01K 97/12* (2013.01); *B63B 49/00* (2013.01); *H04L 67/12* (2013.01)

(58) Field of Classification Search
  CPC ......... G01S 15/96; A01K 79/00; A01K 97/12; B63B 49/00; H04L 67/12; B63H 2021/216; B63H 20/007
  See application file for complete search history.

(56) References Cited

U.S. PATENT DOCUMENTS

| | | | |
|---|---|---|---|
| 6,273,771 B1 * | 8/2001 | Buckley | G08G 3/02 |
| | | | 114/144 RE |
| 8,381,671 B2 | 2/2013 | Bernoehr et al. | |

(Continued)

FOREIGN PATENT DOCUMENTS

WO    WO-2023219717 A1 *    11/2023    ............. A01K 79/00

OTHER PUBLICATIONS

"IFTTT", Wikipedia (Website), Mar. 22, 2021, 5 pages. URL: https://en.wikipedia.org/wiki/IFTTT.

*Primary Examiner* — Daniel Pihulic
(74) *Attorney, Agent, or Firm* — Reinhart Boerner Van Deuren P.C.

(57) ABSTRACT

Methods of situationally controlling marine devices connected via a one boat network on a watercraft are presented. The marine devices are selected from fishfinders or other OBN devices, trolling motors, heading sensors, main propulsion engine, i-Pilot Link, shallow water anchors, AIS/MARPA, smart chargers or power monitors, downriggers, trim tabs, drift paddles, lighting, sonar and imaging transducers, chart plotters, foot pedals, handheld remote controls, and mobile marine apps. The method includes the steps of identifying at least one situational condition of at least one first marine device, identifying at least one second marine device, and triggering a situational control action for the at least one second marine device when the at least one situational condition for the at least one first marine device is met. The methods include situationally controlling a speed of a trolling motor and anchoring of the watercraft, as well as providing advanced power management thereon.

85 Claims, 16 Drawing Sheets

(51) Int. Cl.
*A01K 97/12* (2006.01)
*B63B 49/00* (2006.01)
*H04L 67/12* (2022.01)

(56) References Cited

U.S. PATENT DOCUMENTS

| | | |
|---|---|---|
| 8,495,963 B2 | 7/2013 | Bernoehr et al. |
| 10,150,551 B2 | 12/2018 | Steward et al. |
| 10,739,771 B2 | 8/2020 | Miller et al. |
| 10,990,622 B2 | 4/2021 | Laster et al. |
| 11,130,553 B2 * | 9/2021 | Salisbury ................ B63H 21/21 |
| 2004/0047237 A1 | 3/2004 | Betts et al. |
| 2012/0232719 A1 * | 9/2012 | Salmon ................... G01S 15/88 |
| | | 701/2 |
| 2013/0085630 A1 * | 4/2013 | Ninomiya ................ G01S 7/629 |
| | | 701/431 |
| 2020/0062365 A1 * | 2/2020 | Anderson ........... H04W 12/068 |
| 2021/0129963 A1 * | 5/2021 | Sargazikoosheh ...... B63B 79/10 |
| 2023/0059445 A1 | 2/2023 | Lammers-Meis et al. |
| 2023/0367008 A1 * | 11/2023 | Freeman ................ B63B 49/00 |

\* cited by examiner

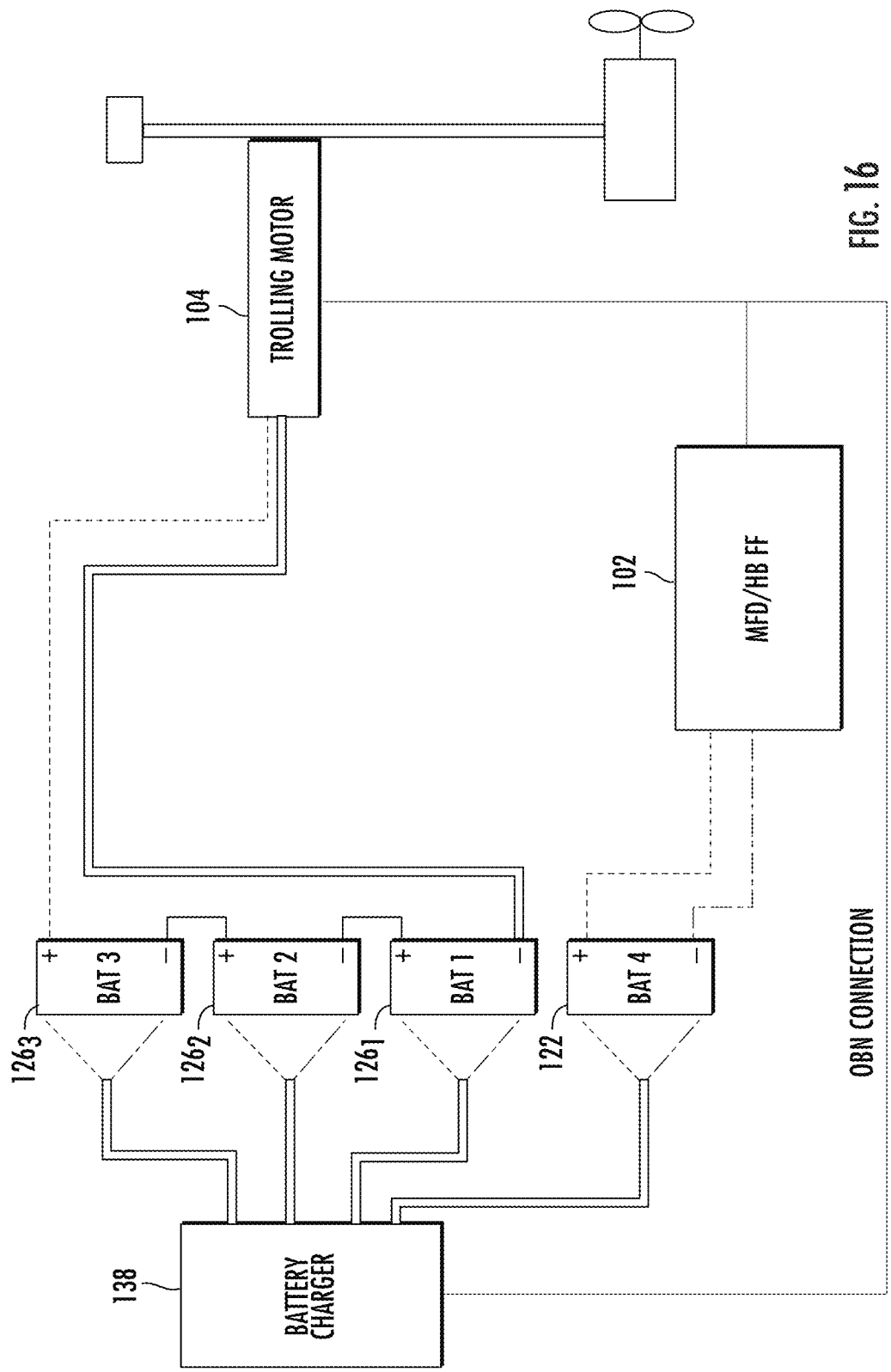

ONE BOAT NETWORK GROUPS AND METHODS OF IFTTT OPERATION THEREOF

FIELD OF THE INVENTION

This invention generally relates to marine equipment for use on a fishing boat, and more particularly to networked control and intuitive situational operation of such equipment.

BACKGROUND OF THE INVENTION

"If This Then That" (commonly known as IFTTT), is a service that allows a user to program a response to events in the world of various kinds. While such IFTTT systems and controls are finding application in the terrestrial world, particularly in a connected home environment, adoption and application of such on fishing watercraft has not been widespread. Instead, most anglers are required to individually control the various diverse equipment on their fishing watercraft, often selected and controlled differently based on the species of fish that is their quarry, the position in the watercraft from which they are fishing, the time of day, weather conditions, etc.

Many anglers prefer to configure their watercraft and control their equipment themselves. However, the continuing incorporation of advanced electronics used in such equipment, while often providing enhanced performance via a myriad of individual settings, demands that anglers spend a good deal of time working with these equipment settings so as to tune the performance to an individual's liking. Unfortunately, most anglers do not have the time or inclination to engage in such performance tuning, as opposed to actually fishing during the limited amount of time that they have on the water.

Still further, and regardless of the time that may be required to tune in their equipment, many anglers still prefer their decisions on what works best for them on the water over any preset or preprogrammed settings. Because the success of an angler often depends particularly on these individual choices, many anglers shun the out-of-the-box setup parameters and prefer to make their own if-this-then-that determinations.

Unfortunately, even the most attuned angler faces changing weather, water, depth, etc. conditions while fishing that can render the perfect selected settings for various pieces of equipment unsatisfactory. Still further, even when the selected settings are still applicable for a new fishing location, e.g. on a lake, the amount of time to turn on and off, stow and deploy, position and reposition the desired equipment detracts from the time actually spent fishing.

Additionally, with the number of pieces of electronic equipment typically installed on a fishing watercraft, the amount of time necessary to turn on and off the desired equipment, including possible time to boot up the equipment, also detracts from the time fishing. As a result, many anglers simply leave the equipment powered even if it is not specifically being used at the time. Unfortunately, because the equipment is powered from batteries carried on the fishing watercraft, powering equipment unnecessarily drains the batteries and again reduces the amount of time that an angler can fish.

In view of all of these conflicting requirements, in spite or because of advances in marine electronics and the change in location and/or conditions while fishing, there is a need in the art for a system and method that aids an angler in controlling the numerous pieces of equipment on a fishing watercraft without removing the individual choices on how to fish or what works best for that particular angler, while minimizing the time and attention to such equipment so as to maximize the time fishing.

Embodiments of the present invention provide such systems and methods. These and other advantages of the invention, as well as additional inventive features, will be apparent from the description of the invention provided herein.

BRIEF SUMMARY OF THE INVENTION

In view of the above, embodiments of the present invention provide new and improved systems and methods that overcome one or more of the problems existing in the art. More particularly, embodiments of the present invention provide new and improved systems and methods of control and intuitive operation of marine equipment, particularly on a fishing watercraft. Still more particularly, embodiments of the present invention provide new and improved systems and methods of networked control and intuitive operation of marine equipment.

In one embodiment, such systems and methods provide networked control and intuitive operation of marine equipment based on predetermined operating modes based on different fishing conditions, species, depth, and environmental conditions. In other embodiments, such systems and methods provide networked control and intuitive operation of marine equipment based on angler preferred operating modes based on different fishing conditions, species, depth, and environmental conditions.

In certain embodiments of the present invention, IFTTT control methodologies are utilized to enable automated control of various pieces or groups of pieces of marine equipment. Such embodiments may use "if" conditions such as, e.g. deployed, stowed, connected, disconnected, on, off, pinging, transmitting, rotating, before sunrise, after sunset, raining, waypoint marked, spot lock marked, spot locked, target locked, etc. Depending on the configuration of the particular fishing watercraft, certain embodiments may use "this" devices such as, e.g. fishfinders having a multifunction display (MFD), trolling motors, i-Pilot Link, shallow water anchors (SWA), Automatic Identification System/Mini-automatic radar plotting aid (AIS/MARPA), smart charger or power monitor, downriggers, trim tabs, drift paddles, lighting, sonar and imaging transducers, e.g. Mega 360 imaging, Mega Live imaging, Side imaging, down imaging, chart plotter, foot pedals, mobile apps, Mega Live Target Lock system, hand-held remote control, etc. Other OBN devices may also include displays or MFDs, and information provided to the fishfinders for display thereon may also be provided to and displayed on such other OBN devices, e.g. remote controls, smart phones, etc. In some embodiments, the "then that" conditions may include standby, wake-up, turn-on, turn-off, transmit, ping, deploy, stow, mark waypoint, spot lock, target lock, sweep mode, home mode, trolling motor sync, target lock sync, increase/decrease depth, increase/decrease speed, etc.

In an embodiment of the present invention, the systems and methods allow an angler to group various pieces of equipment into functional fishing groups. Such groups may be unique collections of equipment, may overlap certain equipment, may be comprised of a superset or subset of equipment, or may include all of the same equipment but operate differently based on species, time of day, location, environmental conditions, etc.

In one embodiment, the systems and methods of the present invention employ at least one of the following IFTTT control strategies: if this trolling motor is deployed, then put that MFD Group 1 into Standby Mode and Group 2 into Normal Mode; if this trolling motor is stowed, then put that MFD Group 2 into Standby Mode and Group 1 into Normal Mode; if this MFD unit GPS Time indicates that it is before sunrise and after sunset and speed over ground (SOG) is less than 2 MPH, then turn on Anchor Lights; if this MFD unit GPS Time indicates that it is before sunrise and after sunset and SOG is greater than 2 MPH, then turn on Anchor Lights and Nav Lights; if this MFD unit GPS Time indicates that it is before sunrise and after sunset and SWA is deployed, then turn on Anchor Lights; if this MFD unit GPS Time indicates that it is before sunrise and after sunset and SWA is stowed, then turn on Anchor Lights and Nav Lights; if this MEGA Live is pinging, then turn off that MEGA SI+ and MEGA DI+ transducer beam, etc.

In addition to embodiments that provide control of marine equipment as discussed previously, advances in brushless motor technology used in some embodiments of the trolling motor, specifically the motor control board and inverter, open the door to advanced motor control opportunities besides just turning it on and off, particularly when combined control inputs and data from other marine equipment hardware and technology in embodiments that utilize an integrated marine equipment network, such as the One Boat Network (OBN) provided by the assignee of the instant application. Such embodiments provide anglers with advanced power management and fishing watercraft control features via selectable user modes based on fishing conditions.

In embodiments of the present invention, a real time trolling system monitor is provided to provide on and/or off board monitoring of battery charging and utilization. The trolling motor and fish finder(s) are networked on the watercraft, e.g. via the OBN provided by the assignee of the instant application, via Ethernet. In one embodiment, the motor control board, the inverter, and/or the battery charger measure the trolling motor battery voltage and trolling motor current draw at different points. In an embodiment, the inverter measures the voltage at the motor (at the end of the motor tube of the trolling motor in one embodiment), the motor control board measures the voltage at the top of the motor tube where the control electronics are housed, and the battery charger measures the voltage at the battery (ies). Besides other functions, the sensing by the motor control board allows an assessment of the battery condition and whether the battery charger is connected and providing charge to the battery in an embodiment where the battery charger does not provide such information via the OBN. The charger can provide voltage information on the OBN while not charging or if AC power is not applied.

In certain embodiments, the inverter may be controlled by the motor control board to provide regeneration of the batteries in situations when the trolling motor is deployed and the trolling motor propeller is driven by the water current. Such situations may occur, e.g., when the watercraft is anchored in a river or other area of moving water relative to the motor, when the watercraft is propelled by the main gasoline powered engine (recharging particularly for the separate batteries used for powering the electronic fishing equipment that are not connected to the alternator of the main engine), etc.

In certain embodiments, the fish finder microprocessor performs the computation of battery condition, display system status on the multi-function display (MFD) (and across other units on network), and may send the system status wirelessly to a mobile app, e.g. the FishSmart mobile app. If the fish finder is connected to another mobile device, e.g. a smart phone, etc., the mobile device may also display system status on a mobile app, an One Boat Network (OBN) app, and in embodiments paired with capable chargers, provide state of charging progress, hours of charge time remaining for full charge, and confirm AC power input.

In an embodiment of the present invention, the systems and method provide a smart start function. This smart start function senses the direction that the trolling motor is pointed relative to the keel line of the boat via an external or integrated heading sensor. The trolling motor controller automatically controls ramp up speed to reduce sudden or unexpected acceleration, which can otherwise cause an angler to lose balance, especially when the trolling motor is pointed 90 degrees to the keel line and speed dial is set to a high setting.

In embodiments of the present invention, the systems and methods provide various fishing condition modes. Such modes are selected by the angler via the fish finder, i-Pilot remote control, or mobile app, e.g. an OBN mobile app. Such selection may be made based on wind, current, trolling system battery status, and type of fishing application. Once a particular fishing mode is selected, the motor control board drives the inverter on the brushless trolling motor to control the trolling motor performance based on desired parameters of each mode. Such performance control is not limited to embodiments that utilize a brushless motor, but instead is also available via a motor control board for the brushed motors also.

In one embodiment an ECO-MODE is provided that optimizes performance for maximum trolling system efficiency in moderate fishing conditions. In another embodiment a LOW POWER MODE is provided that reduces performance to maximize remaining desired on-water time. Such a LOW POWER MODE relies on the battery smart charger or power monitor determination that the trolling motor batteries have reached a low level. In such mode the motor control limits the maximum current to the trolling motor to extend the battery life. In some embodiments, the low power mode, upon determination of an extremely low battery, will reduce the screen brightness on the MFDs and will turn off certain equipment not necessary of safe operation of the watercraft to allow operation of such for as long as possible.

In a further embodiment a TROLLING MODE is provided that takes advantage of the networked fish finder, downriggers, and temperature at depth sensors, to automatically adjust surface trolling speed for optimal bait presentation at depth. In a still further embodiment, a BEAST MODE is provided that optimizes performance for extreme fishing conditions (high wind, strong tidal current, river fishing, open water trolling).

In other embodiments of the present invention, the systems and methods provide smart anchoring modes that utilize the trolling motor, the anchors, e.g. SWA, and the fish finders that are connected on the network. An embodiment provides an EXTREME SPOT LOCK MODE that allows the trolling motor and anchor(s) to pin the boat in a desired orientation regardless of wind, waves, and current. In this mode when the shallow water anchor is down, particularly when only a single shallow water anchor is down, boat orientation is maintained by using the trolling motor to position the front of the boat. The orientation may be set and adjusted by the angler once this mode has been entered, and in one embodiment maintains the current orientation of the watercraft when the mode is entered.

In another embodiment a SMART BOTTOM MODE is provided that enables the system to automatically use real time bottom hardness data from the sonar to deliver optimal anchoring force when the anchor(s) is (are) deployed.

In still other embodiments, the systems and methods utilize a bow mounted trolling motor and a transom mounted trolling motor or motor pod that are connected on the network. Such embodiments provide an ADVANCED SPOT LOCK mode that allows watercraft orientation to be controlled using bow and stern motors regardless of wind, waves, and current.

In a further embodiment of the present invention, the systems and methods provide a Deep Weeds Mode. This mode is beneficial when fishing in weed-choked areas that are common in the bass market. A typical soft start of the trolling motor can be a hinderance and cause weeds to become more easily entangled on and around the lower unit and prevent the motor from ramping up to its full power capacity. In view of this issue, the Deep Weeds Mode changes, e.g. increases or decreases the ramp rate, the trolling motor soft start, on demand in one embodiment and by default in another. In such mode, the trolling motor ramps up to the speed setting that is currently set at a fast rate, which may be set or adjusted by the angler from as fast as possible within the capability of the motor control board to a rate lower than that but higher than the typical soft start to reduce the likelihood of weed entanglement.

In an embodiment of the present invention, the systems and methods provide a Species Select Mode that allows an angler to dial in their trolling motor into the type of fishing the angler is performing. Such an embodiment associates use case scenarios based on angler input with a targeted species and tracks operating conditions of the marine equipment during same. A shortcut is then provided that automatically sets similar operating parameters to ensure repeatability of optimal speeds and methods that target certain species. In an embodiment used, e.g., for walleye, the system may automatically set the trolling speed to 1 mph and the fishing depth to 14-18 ft. Alternatively, an embodiment allows the anger to preset the operating conditions for each desired species within the user interface.

In a further embodiment the systems and methods of the present invention provide a River/Current Spot Lock Mode. In this mode, while the trolling motor is operating in Spot Lock, the angler can use the trolling motor foot pedal momentary button to steer manually until the angler releases the button. Once released the trolling motor would automatically re-engage the Spot Lock function at that new location. Embodiments also provide for such manually steer/control the trolling motor while in this mode from any of the other ancillary connected devices.

In a further embodiment of the present invention, an Auto Stow for Transport mode is provided. This mode operates, automatically or upon enablement by the angler, any time the main propulsion engine is started, to automatically turn off and stow the trolling motor and/or retract the shallow water anchor(s). This mode also allows the angler to include other functions, e.g. placing the bow mounted fish finders into standby mode, turning off the MEGA Live and MEGA 360 sonar transducers, etc.

In another embodiment for use on watercraft that include a trolling motor whose depth can be adjusted, e.g. the Instinct trolling motor made by the assignee of the present application, the systems and methods of the present invention includes an Instinct Shallow Sense Mode. In such mode the fish finder automatically senses shallow water and limits how far down the trolling motor would trim down into the water in order to protect the motor and propeller.

In a preferred embodiment, a method of situationally controlling marine devices connected via a one boat network (OBN) on a watercraft is provided. The marine devices are selected from fishfinders or other OBN devices, trolling motors, heading sensors, main propulsion engine, i-Pilot Link, shallow water anchors, Automatic Identification System/Mini-automatic radar plotting aid (AIS/MARPA), smart charger or power monitor, downriggers, trim tabs, drift paddles, lighting, sonar and imaging transducers, chart plotters, foot pedals, handheld remote controls, and mobile marine apps. The method identifies at least one situational condition of at least one marine device, at least one other marine device, and triggers a situational control action for the at least one other marine device when the situational condition for the first marine device is met.

Preferably, the step of identifying the at least one situational condition identifies whether the first marine device is deployed, stowed, connected, disconnected, on, off, pinging, transmitting, rotating, indicating a time before sunrise, indicating a time after sunset, or identifying a predetermined GPS location. The step of triggering the situational control action includes triggering the second marine device to enter a standby mode, wake-up, turn on, turn off, transmit, ping, deploy, stow, mark a waypoint, go to a waypoint, spot lock, target lock, increase depth, decrease depth, increase speed, or decrease speed.

In an embodiment the identification of the at least one second marine device includes grouping at least two second marine devices into a functional fishing group. In such embodiment the step of triggering the situational control action includes triggering a marine device specific situational control action for each of the at least two second marine devices in the functional fishing group.

In one embodiment the step of triggering the marine device specific situational control action for each of the at least two second marine devices includes triggering a same marine device specific situational control action for each of the at least two second marine devices. In another embodiment the step of triggering the marine device specific situational control action for each of the at least two second marine devices includes the step of triggering a different marine device specific situational control action for each of the at least two second marine devices. In yet another embodiment the step of triggering the marine device specific situational control action for each of the at least two second marine devices includes triggering a different marine device specific situational control action for at least one of the at least two second marine devices.

In one embodiment the step of grouping at least two second marine devices into the functional fishing group includes grouping at least two second marine devices into different functional fishing groups based on different situational conditions of the at least one first marine device. In one embodiment the step of grouping at least two second marine devices into different functional fishing groups includes grouping different second marine devices into each of the different functional fishing groups. In another embodiment the step of grouping at least two second marine devices into different functional fishing groups includes grouping at least some same second marine devices into at least two of the different functional fishing groups. In yet another embodiment the step of grouping at least two second marine devices into different functional fishing groups includes grouping the same second marine devices into at least two of the different functional fishing groups. In such embodiment, the step of triggering the marine device specific situational control action for each of the at least two second marine devices in each of the different functional fishing groups includes generating different marine device specific situational control actions based on at least one of species for which an angler is fishing, time of day, location, or environmental conditions.

In one embodiment the step of identifying the at least one situational condition includes identifying that the trolling motor is deployed and the step of identifying the second marine devices includes identifying a console mounted fishfinder and a bow mounted fishfinder. Preferably, the step of triggering the situational control action includes causing the console mounted fishfinder to enter a standby mode of operation and causing the bow mounted fishfinder to enter a normal mode of operation.

In another embodiment the step of identifying the at least one situational condition includes identifying that the trolling motor is stowed, and the step of identifying the at least one second marine device includes identifying a console mounted fishfinder and a bow mounted fishfinder. Preferably, the step of triggering the situational control action includes causing the console mounted fishfinder to enter a normal mode of operation and causing the bow mounted fishfinder or other OBN devices to enter a standby mode of operation.

In an embodiment the step of identifying the at least one situational condition includes identifying that the fishfinder or other OBN devices indicates a time before sunrise and after sunset and a speed over ground of less than a predetermined speed. In such embodiment the step of triggering the situational control action includes the step of turning on the lighting for anchoring.

In an embodiment the step of identifying at least one situational condition of the at least one first marine device includes identifying that the fishfinder or other OBN devices indicates a time before sunrise and after sunset and a speed over ground of more than a predetermined speed, the step of identifying the at least one second marine device includes identifying the lighting for anchoring and the lighting for navigation, and the step of triggering the situational control action for the at least one second marine device when the at least one situational condition for the at least one first marine device is met includes turning on the lighting for anchoring and turning on the lighting for navigation.

In another embodiment the step of identifying the at least one situational condition of the at least one first marine device includes identifying that the fishfinder or other OBN devices indicates a time before sunrise and after sunset and that the shallow water anchor is deployed. The step of identifying the at least one second marine device includes identifying the lighting for anchoring, and the step of triggering the situational control action for the at least one second marine device when the at least one situational condition for the at least one first marine device is met includes turning on the lighting for anchoring.

In an embodiment the step of identifying the at least one situational condition of the at least one first marine device includes identifying that the fishfinder or other OBN devices indicates a time before sunrise and after sunset and that the shallow water anchor is stowed. In such embodiment the step of identifying the at least one second marine device includes identifying the lighting for anchoring and the lighting for navigation, and the step of triggering the situational control action includes turning on the lighting for anchoring and turning on the lighting for navigation.

In one embodiment the step of identifying the at least one situational condition of the at least one first marine device includes identifying that the sonar and imaging transducers for live sonar is pinging, and the step of identifying the at least one second marine device includes identifying the sonar and imaging transducers for side imaging sonar and down imaging sonar. In this embodiment the step of triggering the situational control action for the at least one second marine device when the at least one situational condition for the at least one first marine device is met includes turning off the sonar and imaging transducers for side imaging sonar and down imaging sonar.

In an embodiment the step of identifying the at least one situational condition includes identifying that the main propulsion engine is started, and the step of identifying the at least one second marine device includes identifying the trolling motor, the shallow water anchor, bow mounted fishfinder or other OBN devices, sonar and imaging transducers for live imaging, and sonar and imaging transducers for 360° imaging. In this embodiment the step of triggering the situational control action for the at least one second marine device when the at least one situational condition for the at least one first marine device is met includes turning off and stowing the trolling motor, retracting the shallow water anchor, placing the bow mounted fishfinder or other OBN devices in standby mode, turning off the sonar and imaging transducers for live imaging, and turning off the sonar and imaging transducers for 360° imaging.

In one embodiment the step of identifying the at least one situational condition includes identifying that the main propulsion engine is turned off and that the fishfinder or other OBN devices indicates that the watercraft is located on water at a fishing location that is not at a dock. The step of identifying the at least one second marine device includes identifying the trolling motor, the shallow water anchor, bow mounted fishfinder or other OBN devices, bow mounted sonar and imaging transducers. In this embodiment the step of triggering the situational control action for the at least one second marine device when the at least one situational condition for the at least one first marine device is met includes deploying the trolling motor, deploying the shallow water anchor, turning on the bow mounted sonar and imaging transducers.

In an embodiment step of identifying the at least one situational condition of the at least one first marine device includes identifying that the fishfinder or other OBN devices indicates a shallow depth and the trolling motor is deploying. The step of identifying the at least one second marine device includes identifying a trim control for the trolling motor. In this embodiment the step of triggering the situational control action includes controlling the trim control of the trolling motor to limit a depth of deployment to be less than the shallow depth.

In another embodiment the step of identifying the at least one situational condition of the at least one first marine device includes identifying activation of the foot pedal to control the trolling motor to move the watercraft. The step of identifying the at least one second marine device includes identifying the shallow water anchor. In this embodiment the step of triggering the situational control action for the at least one second marine device when the at least one situational condition for the at least one first marine device is met includes retracting the shallow water anchor while the foot pedal is controlling the trolling motor and deploying the shallow water anchor when the foot pedal is no longer controlling the trolling motor.

In an embodiment the step of identifying the at least one situational condition of the at least one first marine device includes identifying that the heading sensor indicates that the trolling motor is pointed at an angle relative to a keel of the watercraft and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes controlling a ramp up speed of the trolling motor to reduce a risk of an angler losing balance.

In one embodiment the step of identifying the at least one situational condition of the at least one first marine device includes receiving an ECO MODE selection from one of the fishfinder or mobile marine app, that a speed control input for the trolling motor on the foot pedal is set to an angler-set position, and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes allocating only a middle portion of an available speed band for the trolling motor, indexing the allocated portion to the speed control input for the trolling motor on the foot pedal, and controlling the speed of the trolling motor based on the allocated portion of the speed band indexed to the angler-set position.

In an embodiment the step of identifying the at least one situational condition of the at least one first marine device includes identifying a low battery condition by the fishfinder or other OBN devices, that a speed control input for the trolling motor on the foot pedal is set to an angler-set position, and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes allocating only a bottom portion of an available speed band for the trolling motor, indexing the allocated portion to the speed control input for the trolling motor on the foot pedal, and controlling the speed of the trolling motor based on the allocated portion of the speed band indexed to the angler-set position. Preferably, the step of triggering the situational control action for the at least one second marine device when the at least one situational condition for the at least one first marine device is met further includes at least one of the steps of reducing a brightness of a display of the fishfinder or other OBN devices, placing a fishfinder or other OBN devices into standby, and turning off non-safety related marine devices.

In an embodiment the step of identifying the at least one situational condition of the at least one first marine device includes receiving a BEAST MODE selection from one of the fishfinder or mobile marine app, that a speed control input for the trolling motor on the foot pedal is set to an angler-set position, and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes allocating only a top portion of an available speed band for the trolling motor, indexing the allocated portion to the speed control input for the trolling motor on the foot pedal, and controlling the speed of the trolling motor based on the allocated portion of the speed band indexed to the angler-set position.

In another embodiment the step of identifying the at least one situational condition of the at least one first marine device includes receiving a DEEP WEEDS MODE selection from one of the fishfinder or mobile marine app, that a speed control input for the trolling motor on the foot pedal is set to an angler-set position, and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes changing a soft start speed ramp up function for the trolling motor to allow the trolling motor to achieve the speed corresponding to the angler-set position at a rate different than the soft start speed ramp rate.

In one embodiment the step of identifying the at least one situational condition of the at least one first marine device includes receiving a CUSTOM SPEED MODE selection from one of the fishfinder or mobile marine app, that a speed control input for the trolling motor on the foot pedal is set to an angler-set position, and that the foot pedal is being activated to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes allocating an angler selected portion of an available speed band for the trolling motor, indexing the allocated portion to the speed control input for the trolling motor on the foot pedal, and controlling the speed of the trolling motor based on the allocated portion of the speed band indexed to the angler-set position.

In one embodiment the step of allocating an angler selected portion of an available speed band for the trolling motor includes allocating an entirety of the available speed band for the trolling motor to be indexed in overlapping ranges for each angler-set position of the speed control input for the trolling motor on the foot pedal. In another embodiment the step of allocating an angler selected portion of an available speed band for the trolling motor includes allocating portions of the available speed band for the trolling motor to be indexed to multiple angler-set positions of the speed control input for the trolling motor on the foot pedal. In a further embodiment the step of allocating an angler selected portion of an available speed band for the trolling motor includes selecting a specific trolling motor speed to be indexed to each angler-set positions of the speed control input for the trolling motor on the foot pedal.

In an embodiment the step of identifying the at least one situational condition of the at least one first marine device includes identifying activation of the foot pedal to control the trolling motor to move the watercraft, identifying that the downriggers are set to a depth of between fifteen and forty feet, and that temperature at depth sensors indicate water temperature of between approximately forty to sixty-five degrees. The step of identifying the at least one second marine device includes identifying the trolling motor. In this embodiment the step of triggering the situational control action for the at least one second marine device when the at least one situational condition for the at least one first marine device is met includes controlling the trolling motor speed to between 1.5 to 3 mph.

In one embodiment the step of identifying the at least one situational condition of the at least one first marine device includes receiving an initial SPECIES SELECT MODE selection from one of the fishfinder or mobile marine app. The step of identifying the at least one second marine device includes identifying each of the marine devices and recording an operational status thereof. In this embodiment the step of triggering the situational control action for the at least one second marine device when the at least one situational condition for the at least one first marine device is met inlcudes controlling each of the marine devices to operate in accordance with the recorded operational status thereof upon receipt of a subsequent SPECIES SELECT MODE selection from one of the fishfinder or mobile marine app.

In an embodiment the step of identifying the at least one situational condition of the at least one first marine device includes receiving an EXTREME SPOT LOCK MODE selection from one of the fishfinder or mobile marine app, and the step of identifying the at least one second marine device includes identifying the trolling motor and the shallow water anchor. In this embodiment the step of triggering the situational control action for the at least one second marine device when the at least one situational condition for the at least one first marine device is met includes deploying the shallow water anchor, steering the trolling motor to provide thrust normal to the keel of the watercraft, and controlling the trolling motor speed to maintain an orientation of the watercraft.

In one embodiment the step of controlling the trolling motor speed includes running the trolling motor in forward or reverse to maintain the orientation of the watercraft. In another embodiment the step of steering the trolling motor to provide thrust normal to the keel of the watercraft includes steering the trolling motor to 90° or 270° relative to the keel of the watercraft for turning the watercraft clockwise or counterclockwise to maintain the orientation of the watercraft about the shallow water anchor's anchor point. In yet another embodiment the step of controlling the trolling motor speed includes controlling the trolling motor speed to adjust the orientation of the watercraft around the shallow water anchor's anchor point.

In an embodiment the step of identifying the at least one situational condition of the at least one first marine device includes identifying a bottom hardness from the fishfinder or other OBN devices, and the step of identifying the at least one second marine device includes identifying the shallow water anchor. In this embodiment the step of triggering the situational control action for the at least one second marine device when the at least one situational condition for the at least one first marine device is met includes controlling the anchoring force with which the shallow water anchor is deployed based on the bottom harness identified from the fishfinder or other OBN devices to deliver optimized anchoring force.

In one embodiment the step of identifying the at least one situational condition of the at least one first marine device includes receiving an ADVANCED SPOT LOCK MODE selection from one of the fishfinder or mobile marine app, and the step of identifying the at least one second marine device includes identifying the trolling motor and the motor pod. In this embodiment the step of triggering the situational control action for the at least one second marine device when the at least one situational condition for the at least one first marine device is met includes controlling the trolling motor speed and direction to maintain the bow of the watercraft at a current location and controlling the motor pod speed and direction to maintain an orientation of the watercraft relative to the bow of the watercraft.

In an embodiment the step of identifying the at least one situational condition of the at least one first marine device includes receiving an ADVANCED SPOT LOCK MODE selection from one of the fishfinder or mobile marine app, and the step of identifying the at least one second marine device includes identifying a bow mounted trolling motor and a stern mounted trolling motor. In this embodiment the step of triggering the situational control action for the at least one second marine device when the at least one situational condition for the at least one first marine device is met includes controlling the bow mounted trolling motor speed and direction to maintain the bow of the watercraft at a current location and controlling the stern mounted trolling motor speed and direction to maintain an orientation of the watercraft relative to the bow mounted trolling motor.

In one embodiment the step of identifying the at least one situational condition of the at least one first marine device includes receiving a RIVER/CURRENT SPOT LOCK MODE selection from one of the fishfinder or mobile marine app and identifying activation of the foot pedal to control the trolling motor to move the watercraft. The step of identifying the at least one second marine device includes identifying the trolling motor. In this embodiment the step of triggering the situational control action for the at least one second marine device when the at least one situational condition for the at least one first marine device is met includes suspending spot lock control of the trolling motor speed and direction to allow angler control of the trolling motor via the foot pedal, and re-engaging spot lock control of the trolling motor speed and direction to maintain the bow of the watercraft at a new location of the watercraft once activation of the foot pedal has ceased.

In an embodiment of the present invention, the step of identifying a low battery condition by the fishfinder or other OBN devices includes monitoring a voltage at the battery via the smart charger or power monitor, transmitting a value of the voltage at the battery to the fishfinder or other OBN devices, comparing the voltage to a low voltage threshold, and displaying by the fishfinder or other OBN devices a low battery condition message when the voltage is below the low voltage threshold.

In an embodiment wherein the trolling motor is a DC motor driven by an inverter that is controlled by a motor control board, the method also includes monitoring a voltage and a current at the DC motor by the inverter, transmitting a value of the voltage at the DC motor and a value of the current to the fishfinder or other OBN devices, and displaying by the fishfinder or other OBN devices at least one of the value of the voltage at the battery, the value of the voltage at the DC motor, or the value of the current. In one embodiment the method also includes calculating a power dissipation from the battery to the DC motor and displaying by the fishfinder or other OBN devices a wiring issue warning when the power dissipation exceeds a threshold.

In an embodiment wherein the battery includes a number of batteries, the step of monitoring the voltage at the battery via the smart charger or power monitor includes monitoring the voltage at each of the plurality of batteries, the step of transmitting the value of the voltage at the battery to the fishfinder or other OBN devices includes transmitting the value of the voltage at each of the plurality of batteries to the fishfinder or other OBN devices, the step of comparing the voltage to the low voltage threshold includes comparing the voltage for each of the plurality of batteries to the low voltage threshold, and the step of displaying by the fishfinder or other OBN devices a low battery condition message when the voltage is below the low voltage threshold includes displaying by the fishfinder or other OBN devices the low battery condition message when the voltage for any one of the plurality of batteries is below the low voltage threshold.

In one embodiment the method also includes the step of receiving by the fishfinder or other OBN devices a battery type input, calculating an initial state of charge of the battery based at least on the battery type input and the value of the voltage at the battery when the trolling motor is not operating, and displaying the initial state of charge on the fishfinder or other OBN devices. In an embodiment the method also includes the steps of monitoring current flow from the battery, calculating an energy usage, calculating remaining state of charge as a reduction from the initial state of charge by the energy usage, and displaying the remaining state of charge on the fishfinder or other OBN devices. Another embodiment also includes the steps of calculating an average energy usage, projecting a remaining run time based on the remaining state of charge and the average energy usage, and displaying the remaining run time on the fishfinder or other OBN devices. In one embodiment the method includes the steps of receiving a battery swap input and resetting the remaining state of charge to the initial state of charge.

In an embodiment, the method also includes the step of controlling the inverter to operate in quadrant II to provide regeneration of the battery when the trolling motor is driven by current flow.

In an embodiment of the present invention, a method of situationally controlling a speed of a trolling motor on a watercraft, includes the steps of receiving a speed control input for the trolling motor from the foot pedal corresponding to an angler-set position, receiving an input indicating that the foot pedal is being activated to turn on the trolling motor to move the watercraft, receiving a trolling motor mode control input, and situationally controlling energization of the trolling motor based on the speed control input and the trolling motor mode control input.

In one embodiment the step of receiving the trolling motor mode control input includes identifying that a heading sensor of the trolling motor indicates that the trolling motor is pointed at an angle relative to a keel of the watercraft. In such embodiment the step of situationally controlling energization of the trolling motor based on the speed control input and the trolling motor mode control input includes controlling a ramp up of the speed of the trolling motor to reduce a risk of an angler losing balance.

In an embodiment the step of receiving the trolling motor mode control input includes receiving an ECO MODE selection from one of a fishfinder or a mobile marine app. In this embodiment the step of situationally controlling energization of the trolling motor based on the speed control input and the trolling motor mode control input includes allocating only a middle portion of an available speed band for the trolling motor, indexing the allocated portion to the speed control input for the trolling motor on the foot pedal, and controlling the speed of the trolling motor based on the allocated portion of the speed band indexed to the angler-set position.

In an embodiment the step of receiving the trolling motor mode control input includes identifying a low battery condition by the fishfinder or other OBN devices. In this embodiment the step of situationally controlling energization of the trolling motor based on the speed control input and the trolling motor mode control input includes allocating only a bottom portion of an available speed band for the trolling motor, indexing the allocated portion to the speed control input for the trolling motor on the foot pedal, and controlling the speed of the trolling motor based on the allocated portion of the speed band indexed to the angler-set position.

In an embodiment the step of receiving the trolling motor mode control input comprises the step of receiving a BEAST MODE selection from one of the fishfinder or mobile marine app. In such embodiment the step of situationally controlling energization of the trolling motor based on the speed control input and the trolling motor mode control input includes allocating only a top portion of an available speed band for the trolling motor, indexing the allocated portion to the speed control input for the trolling motor on the foot pedal, and controlling the speed of the trolling motor based on the allocated portion of the speed band indexed to the angler-set position.

In an embodiment the step of receiving the trolling motor mode control input includes receiving a DEEP WEEDS MODE selection from one of the fishfinder or mobile marine app. In such embodiment the step of situationally controlling energization of the trolling motor based on the speed control input and the trolling motor mode control input includes disabling a soft start speed ramp up function for the trolling motor to allow the trolling motor to achieve the speed corresponding to the angler-set position as quickly as possible.

In an embodiment the step of receiving the trolling motor mode control input includes receiving a CUSTOM SPEED MODE selection from one of the fishfinder or mobile marine app. In this embodiment the step of situationally controlling energization of the trolling motor based on the speed control input and the trolling motor mode control input includes allocating an angler selected portion of an available speed band for the trolling motor, indexing the allocated portion to the speed control input for the trolling motor on the foot pedal, and controlling the speed of the trolling motor based on the allocated portion of the speed band indexed to the angler-set position.

In an embodiment the step of allocating an angler selected portion of an available speed band for the trolling motor includes allocating an entirety of the available speed band for the trolling motor to be indexed in overlapping ranges for each angler-set position of the speed control input for the trolling motor on the foot pedal. In an embodiment the step of allocating an angler selected portion of an available speed band for the trolling motor includes allocating portions of the available speed band for the trolling motor to be indexed to multiple angler-set positions of the speed control input for the trolling motor on the foot pedal. In another embodiment the step of allocating an angler selected portion of an available speed band for the trolling motor includes selecting a specific trolling motor speed to be indexed to each angler-set positions of the speed control input for the trolling motor on the foot pedal.

In an embodiment the step of receiving the trolling motor mode control input includes identifying that the downriggers are set to a depth of between fifteen and forty feet, and that temperature at depth sensors indicate water temperature of between approximately forty to sixty-five degrees. In that embodiment the step of situationally controlling energization of the trolling motor based on the speed control input and the trolling motor mode control input includes controlling the trolling motor speed to between 1.5 to 3 mph.

In an embodiment the step of receiving the trolling motor mode control input includes receiving an initial SPECIES SELECT MODE selection from one of the fishfinder or mobile marine app. The method further includes recording an operational status of the trolling motor upon receipt of the initial SPECIES SELECT MODE selection from one of the fishfinder or mobile marine app. In such embodiment the step of situationally controlling energization of the trolling motor based on the speed control input and the trolling motor mode control input includes controlling the trolling motor to operate in accordance with the recorded operational status thereof upon receipt of a subsequent SPECIES SELECT MODE selection from one of the fishfinder or mobile marine app.

In one embodiment of the present invention, a method of situationally anchoring a watercraft having at least one of a bow mount trolling motor, a shallow water anchor, a stern mount trolling motor, or a stern mount motor pod, includes the steps of receiving an anchoring mode control input, and situationally controlling utilization of at least one of the bow mount trolling motor, the shallow water anchor, the stern mount trolling motor, or the stern mount motor pod based on the anchoring mode control input.

In an embodiment the step of receiving an anchoring mode control input includes receiving an EXTREME SPOT LOCK MODE selection from one of the fishfinder or mobile marine app. In such embodiment the step of situationally controlling utilization of at least one of the bow mount trolling motor, the shallow water anchor, the stern mount trolling motor, or the stern mount motor pod based on the anchoring mode control input includes deploying the shallow water anchor, steering the trolling motor to provide thrust normal to the keel of the watercraft, and controlling the trolling motor speed to maintain an orientation of the watercraft.

In an embodiment the step of controlling the trolling motor speed includes running the trolling motor in forward or reverse to maintain the orientation of the watercraft. In one embodiment the step of steering the trolling motor to provide thrust normal to the keel of the watercraft comprises the step of steering the trolling motor to 90° or 270° relative to the keel of the watercraft for turning the watercraft clockwise or counterclockwise to maintain the orientation of the watercraft about the shallow water anchor's anchor point. In another embodiment the step of controlling the trolling motor speed includes controlling the trolling motor speed to adjust the orientation of the watercraft around the shallow water anchor's anchor point.

In an embodiment the step of receiving an anchoring mode control input includes identifying a bottom hardness from the fishfinder or other OBN devices. In such embodiment the step of situationally controlling utilization of at least one of the bow mount trolling motor, the shallow water anchor, the stern mount trolling motor, or the stern mount motor pod based on the anchoring mode control input includes controlling the anchoring force with which the shallow water anchor is deployed based on the bottom harness identified from the fishfinder or other OBN devices to deliver optimized anchoring force.

In an embodiment the step of receiving an anchoring mode control input includes receiving an ADVANCED SPOT LOCK MODE selection from one of the fishfinder or mobile marine app. In such embodiment the step of situationally controlling utilization of at least one of the bow mount trolling motor, the shallow water anchor, the stern mount trolling motor, or the stern mount motor pod based on the anchoring mode control input includes controlling the trolling motor speed and direction to maintain the bow of the watercraft at a current location and controlling the motor pod speed and direction to maintain an orientation of the watercraft relative to the bow of the watercraft.

In an embodiment the step of receiving an anchoring mode control input includes receiving an ADVANCED SPOT LOCK MODE selection from one of the fishfinder or mobile marine app. In such embodiment the step of situationally controlling utilization of at least one of the bow mount trolling motor, the shallow water anchor, the stern mount trolling motor, or the stern mount motor pod based on the anchoring mode control input includes controlling the bow mounted trolling motor speed and direction to maintain the bow of the watercraft at a current location and controlling the stern mounted trolling motor speed and direction to maintain an orientation of the watercraft relative to the bow mounted trolling motor.

In an embodiment the step of receiving an anchoring mode control input includes receiving a RIVER/CURRENT SPOT LOCK MODE selection from one of the fishfinder or mobile marine app. In such embodiment the step of situationally controlling utilization of at least one of the bow mount trolling motor, the shallow water anchor, the stern mount trolling motor, or the stern mount motor pod based on the anchoring mode control input includes suspending spot lock control of the trolling motor speed and direction to allow angler control of the trolling motor via a foot pedal, and re-engaging spot lock control of the trolling motor speed and direction to maintain the bow of the watercraft at a new location of the watercraft once activation of the foot pedal has ceased.

In one embodiment of the present invention, a method of power management for a watercraft having a networked smart battery charger, fishfinder or other OBN devices, and trolling motor, and at least one battery for supplying power to the trolling motor, includes the steps of monitoring a voltage at the at least one battery via the smart charger or power monitor, transmitting a value of the voltage at the battery to the fishfinder or other OBN devices, comparing the voltage to a low voltage threshold, and displaying by the fishfinder or other OBN devices a low battery condition message when the voltage is below the low voltage threshold.

In an embodiment wherein the trolling motor is a DC motor driven by an inverter that is controlled by a motor control board, the method further includes monitoring a voltage and a current at the DC motor by the inverter, transmitting a value of the voltage at the DC motor and a value of the current to the fishfinder or other OBN devices, and displaying by the fishfinder or other OBN devices at least one of the value of the voltage at the battery, the value of the voltage at the DC motor, or the value of the current. In one embodiment the method further includes calculating a power dissipation from the battery to the DC motor and displaying by the fishfinder or other OBN devices a wiring issue warning when the power dissipation exceeds a threshold.

In an embodiment wherein the battery includes a number of batteries, the step of monitoring the voltage at the battery via the smart charger or power monitor includes monitoring the voltage at each of the plurality of batteries, the step of transmitting the value of the voltage at the battery to the fishfinder or other OBN devices includes transmitting the value of the voltage at each of the plurality of batteries to the fishfinder or other OBN devices, the step of comparing the voltage to the low voltage threshold includes comparing the voltage for each of the plurality of batteries to the low voltage threshold, and the step of displaying by the fishfinder or other OBN devices a low battery condition message when the voltage is below the low voltage threshold includes displaying by the fishfinder or other OBN devices the low battery condition message when the voltage for any one of the plurality of batteries is below the low voltage threshold.

In one embodiment, the method includes disabling motor functionality when the step of comparing the voltage to the low voltage threshold indicates that the voltage is below a normal operation voltage threshold in order to maintain predictable operation of the motor.

In an embodiment the method further includes receiving by the fishfinder or other OBN devices a battery type input, calculating an initial state of charge of the battery based at least on the battery type input and the value of the voltage at the battery when the trolling motor is not operating, and displaying the initial state of charge on the fishfinder or other OBN devices. In one embodiment the method further includes monitoring current flow from the battery, calculating an energy usage, calculating remaining state of charge as a reduction from the initial state of charge by the energy usage, and displaying the remaining state of charge on the fishfinder or other OBN devices.

In an embodiment the method further includes the steps of calculating an average energy usage, projecting a remaining run time based on the remaining state of charge and the average energy usage, and displaying the remaining run time on the fishfinder or other OBN devices. In an embodiment the method further includes the steps of receiving a battery swap input and resetting the remaining state of charge to the initial state of charge.

In an embodiment the method further includes the step of controlling the inverter to operate in quadrant II to provide regeneration of the battery when the trolling motor is driven by water current flow. In an alternative embodiment, the method includes regeneration of the battery when the trolling motor is driven by water current flow for a brushed dc motor utilizing appropriate circuitry as known.

In an embodiment the method further includes the steps of transmitting by the smart battery charger a state of charging process, calculating by the fishfinder or other OBN devices a time remaining to achieve a full state of charge. In an embodiment the method further includes the steps of transmitting by the smart battery charger a state of connection of an external AC input, displaying by the fishfinder or other OBN devices the state of connection of the external AC input.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 16 is a simplified schematic diagram of a networked battery charging system for the marine components of an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are provided various simplified networking diagrams in FIGS. 1-15 with which embodiments of the present invention and through which embodiments of the present invention configure and control operation of the various marine devices, individually and/or in functional and scenario groupings to provide automated and angler configured IFTTT operations on the watercraft. While not shown in each of these simplified networking diagrams, the battery charging system of FIG. 16 may be included or used in each such system to provide charging of the batteries utilized therein. However, these various networking and charging diagrams should be taken by way of example and not by way of limitation, particularly in view of the extensibility of the systems and methods of the present invention to allow individual angler configuration, programming, and operation.

Figure 1:
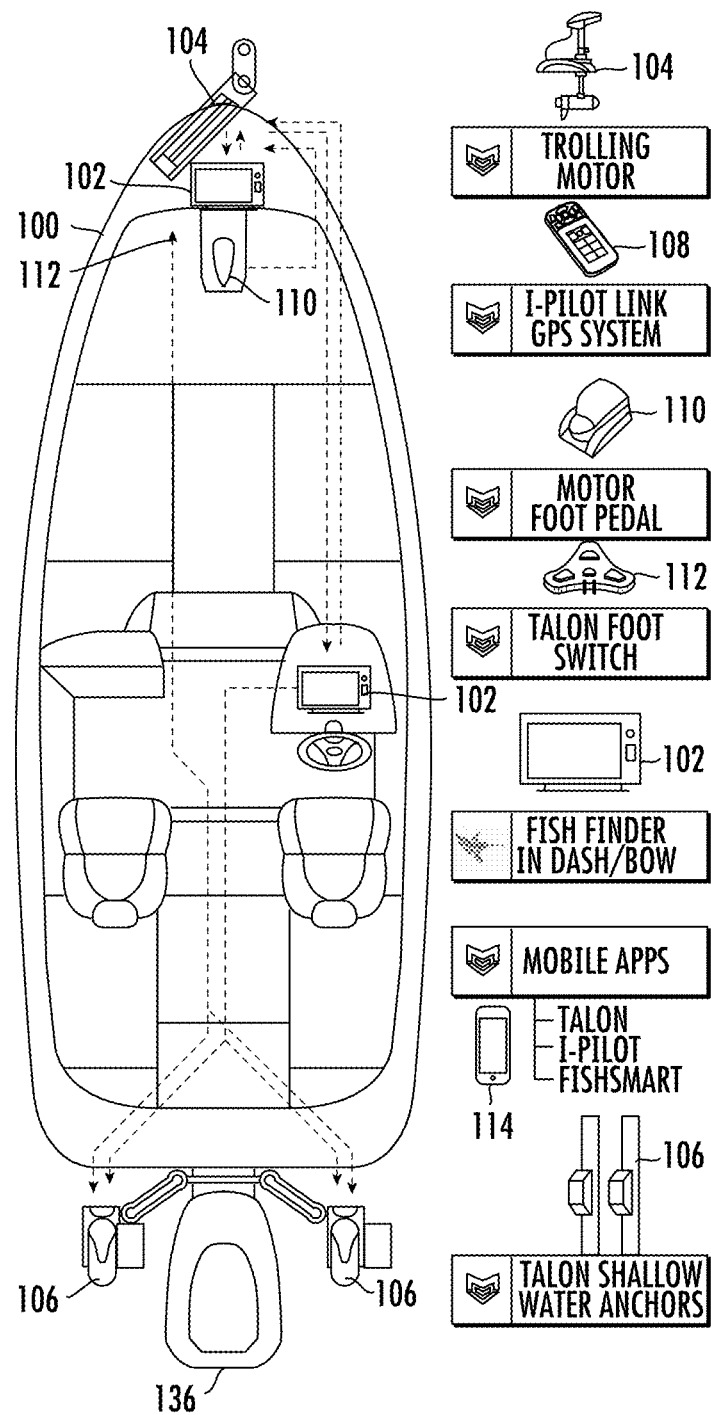
FIG. 1 is a simplified networking and component diagram illustrating an installation of fishing equipment configured and operated in accordance with an embodiment of the present invention having a bow-mounted fish finder unit and a console-mounted fish finder unit networked together, with a bow mounted trolling motor and a pair of stern mounted shallow water anchors, illustrating other control components including an i-Pilot Link remote control, a trolling motor foot pedal, a shallow water anchor foot switch, and a plurality of mobile apps.

Turning now specifically to FIG. 1, there is illustrated a simplified networking diagram of a watercraft having installed thereon networked marine equipment (visualized beside the watercraft) for which embodiments of the system and method of the present invention are particularly well-suited. As illustrated, the watercraft 100 includes a bow mounted fish finder 102 (having a multi-function display (MFD)) and a bow mounted trolling motor 104. Also included at the bow of the watercraft 100 is the foot pedal control 110 for the trolling motor.

In certain embodiments the trolling motor control board, to be discussed more fully below, resides inside of the foot pedal 110 and reads the angler's inputs. Speed, steering, propeller on/off, advanced navigation functions (e.g. spot lock, autopilot, user defined OBN buttons that can be programmed for other OBN networked marine equipment such as shallow water anchor deployment, marking a waypoint, etc.) may all be included on the foot pedal 110.

The foot switch 112 for the shallow water anchors 106, mounted at the stern of the watercraft 100, on either side of the main engine 136, may also be included at the bow of the watercraft 100. The watercraft 100 also includes a console mounted fish finder 102. Illustrated at the side of the watercraft in FIG. 1 is an i-Pilot link remote control 108 and a mobile device such as a smart phone 114 on which mobile apps, including those implementing the systems and methods of the present invention, may be run.

Figure 2:
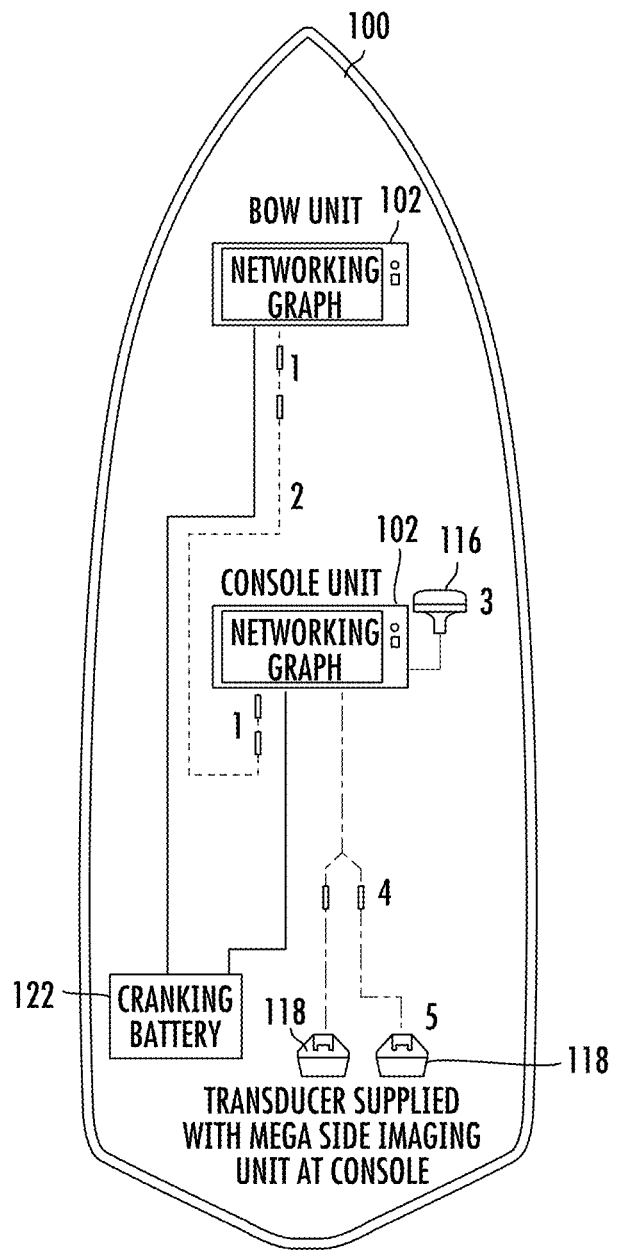
FIG. 2 is a simplified networking diagram illustrating an installation of fishing equipment configured and operated in accordance with an embodiment of the present invention having a bow-mounted fish finder unit and a console-mounted fish finder unit networked together, with a heading sensor GPS puck and high-speed transducer with y-cable.

FIG. 2 is a more simplified networking diagram that illustrates an installation of marine equipment on watercraft 100. As illustrated, a bow mount fish finder 102 is included in addition to the console mount fish finder 102 on which the system and method of the present invention operates in various embodiments. The fish finder 102 also receives input from a GPS and heading sensor 116 as well as inputs from high-speed transducers 118. Depending on the angler's preferences, the high-speed transducers 118 may include a MEGA Side imaging transducer, down imaging transducer, etc.

Figure 3:
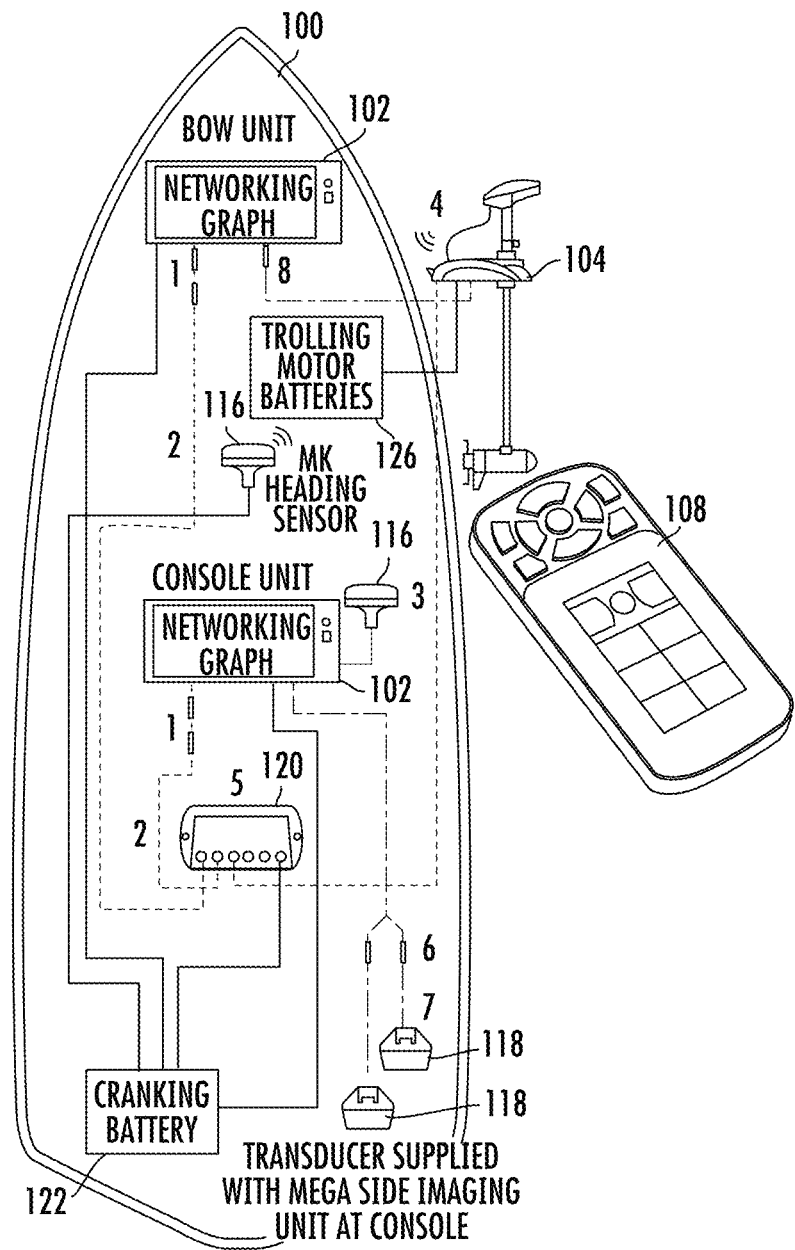
FIG. 3 is a simplified networking diagram illustrating an installation of fishing equipment configured and operated in accordance with an embodiment of the present invention having a trolling motor with i-Pilot Link remote and built-in MEGA Imaging, a bow-mounted fish finder unit and console-mounted fish finder unit, with heading sensor GPS puck and high-speed transducer with y-cable.

FIG. 3 illustrates an installation on the watercraft 100 that is typically for many anglers. The system includes a bow mount fish finder 102 and a trolling motor 104. The trolling motor 104 is powered by a dedicated trolling motor battery 126 (or bank of batteries) as opposed to the cranking battery 122 of the watercraft 100, which powers the other networked marine equipment contained thereon. A console mount fish finder 102 is also included. A pair of GPS heading sensors 116 are included, one for the console mounted fish finder 102, and one for the i-Pilot control of the trolling motor 104. Indeed, this system utilizes the i-Pilot link remote control 108 to provide operational control thereof from any position on the watercraft 100. Due to the increased complexity of the networked installation shown in FIG. 3, an ethernet switch 120 is also included in order to ensure proper networking of the various components thereon. As with the previous installation, high-speed transducers 118 are also included.

Figure 4:
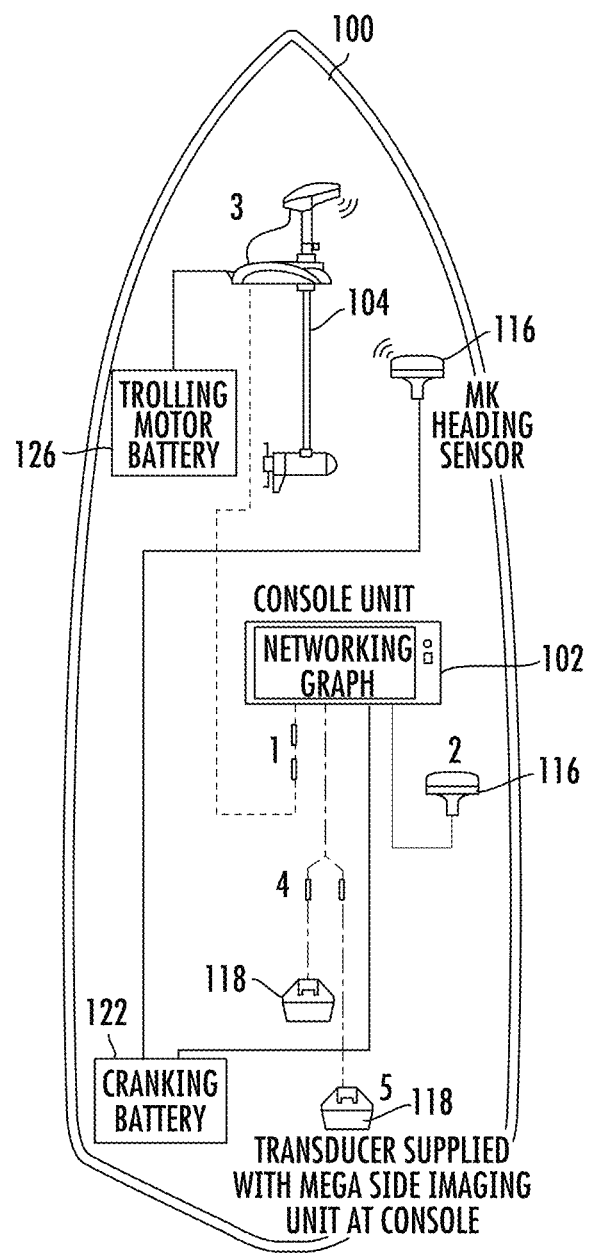
FIG. 4 is a simplified networking diagram illustrating an installation of fishing equipment configured and operated in accordance with an embodiment of the present invention having trolling motor with i-Pilot Link and a console-mounted fish finder unit, with heading sensor GPS puck and high-speed transducer with y-cable.

The networked installation shown in FIG. 4 utilizes a trolling motor 104 mounted on the bow of the watercraft 100 and powered via a dedicated trolling motor battery 126 (or bank of batteries). This trolling motor also preferably includes a heading sensor 116 to allow for i-Pilot functional control. A console mounted fish finder 102 is also included, which receives GPS and heading information from the GPS and heading sensor 116. As with the prior installations, this console mount fish finder 102 also receives input from high-speed transducer assemblies 118, one of which may be a MEGA Side imaging unit. Other than the trolling motor 104, the other networked marine components are powered by the cranking battery 122 in the illustrated installation.

Figure 5:
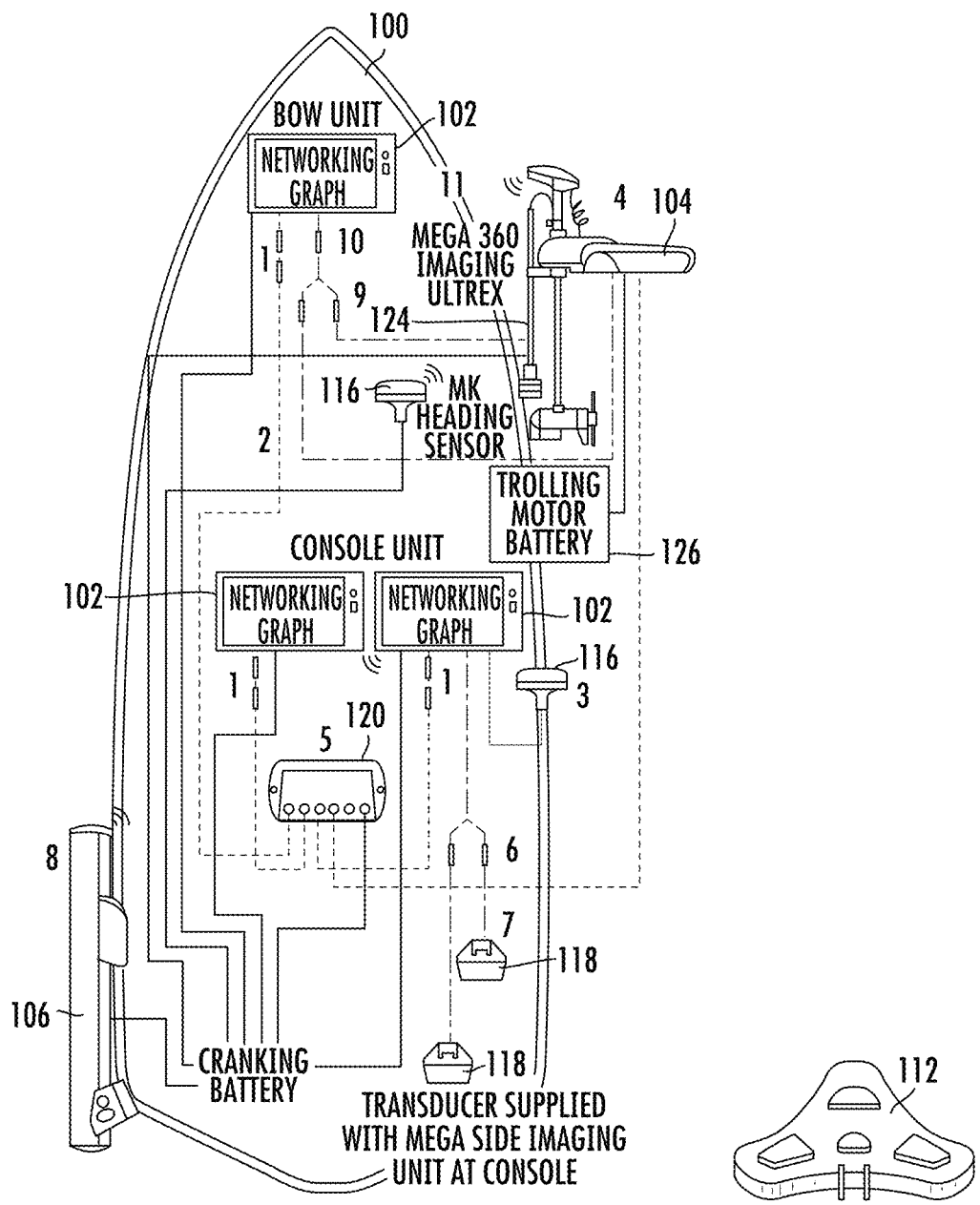
FIG. 5 is a simplified networking diagram illustrating an installation of fishing equipment configured and operated in accordance with an embodiment of the present invention having trolling motor with i-Pilot Link and built-in MEGA Imaging, a bow-mounted fish finder unit, two console-mounted fish finder units, MEGA 360 Imaging, a shallow water anchor and foot switch, with heading sensor GPS puck and high-speed transducer with y-cable.

FIG. 5 illustrates an enhanced network installation for an installation on the watercraft 100. This installation includes a bow mount fish finder 102 along with a bow mount trolling motor 104 that has included therewith a MEGA 360 sonar imaging transducer 124. A heading sensor 116 also provides information to the trolling motor 104 for i-Pilot operation. As with prior installations, and as is typical, the trolling motor 104 utilizes a dedicated trolling motor battery 126 (or bank of batteries). This installation also includes two console mounted fish finders 102. GPS and heading information is provided by the GPS and heading sensor 116, and as with prior installations, the console mount fish finder 102 utilizes two high-speed transducer assemblies 118. An ethernet switch 120 is also included to properly network the marine equipment. This installation also includes a shallow water anchor 106 and preferably a foot switch 112 that provides manual control thereof.

Figure 6:
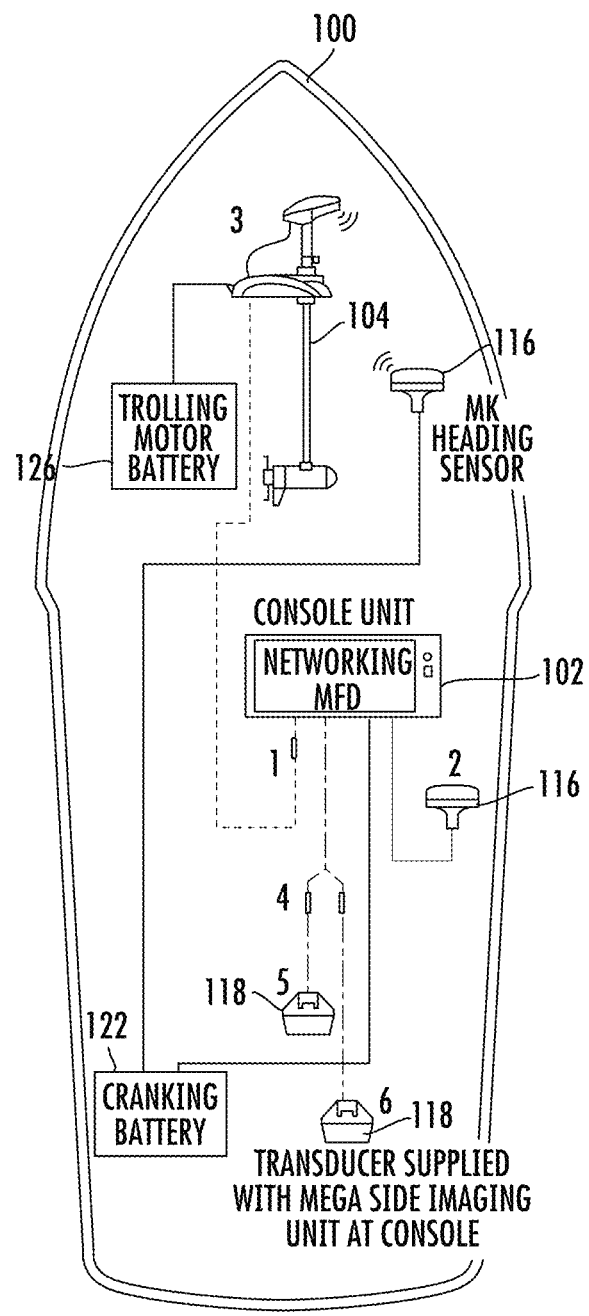
FIG. 6 is a simplified networking diagram illustrating an installation of fishing equipment configured and operated in accordance with an embodiment of the present invention having trolling motor with i-Pilot Link and a console-mounted fish finder unit, with heading sensor GPS puck and high-speed transducer with y-cable.

The networked installation of FIG. 6 is for an installation of the watercraft 100 that utilizes a bow mount trolling motor 104 powered from a dedicated trolling motor battery 126 (or bank of batteries) and a heading sensor 116. A single console mount fish finder 102 is included which receives GPS and heading information from sensor 116 and sonar information from the sonar transducers 118. A cranking battery 122 is also provided to power the marine equipment other than the trolling motor which has its own dedicated battery 126.

Figure 7:
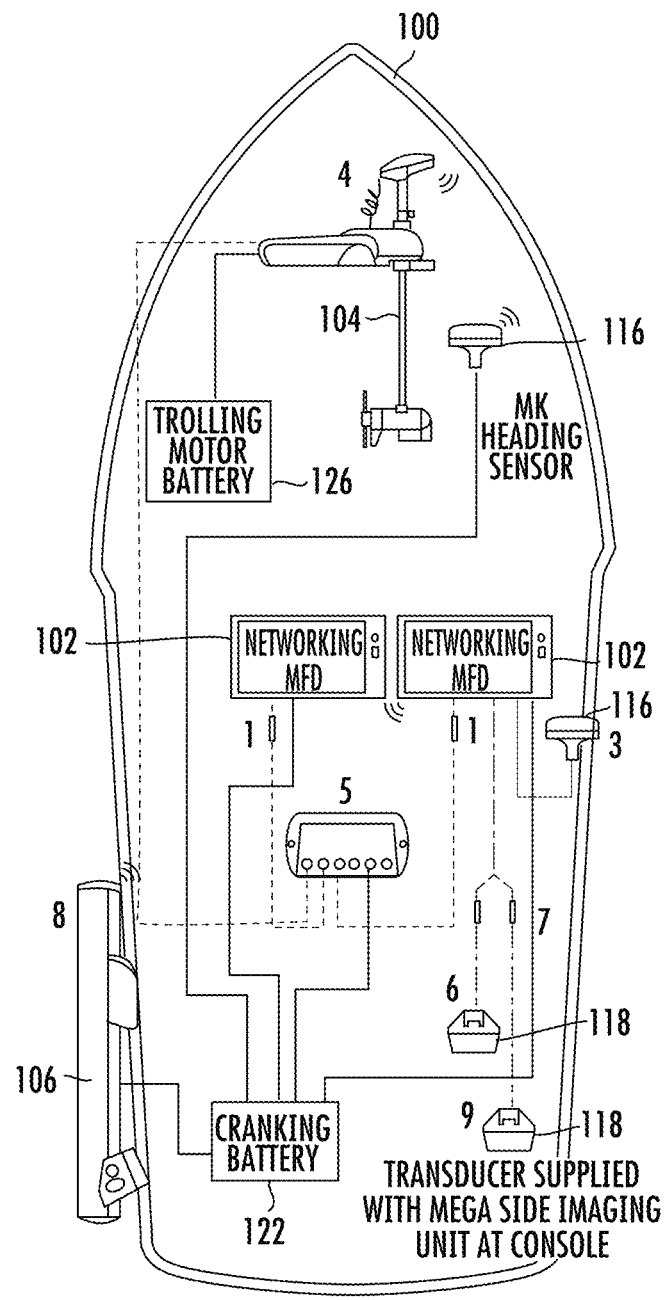
FIG. 7 is a simplified networking diagram illustrating an installation of fishing equipment configured and operated in accordance with an embodiment of the present invention having a trolling motor with i-Pilot Link and two console-mounted fish finder units, with heading sensor GPS puck and high-speed transducer with y-cable.

The installation illustrated in FIG. 7 also includes a bow mount trolling motor 104 on the watercraft 100 that is powered by a dedicated motor battery 126 (or bank of batteries) and receives heading information from sensor 116. In the illustrated installation, a pair of console mount fish finders 102 are utilized, along with the GPS and heading sensor 116 and transducer assemblies 118. The installation also includes a shallow water anchor 106 and requires in the illustrated embodiment an ethernet switch 120 to properly network all of the marine equipment.

Figure 8:
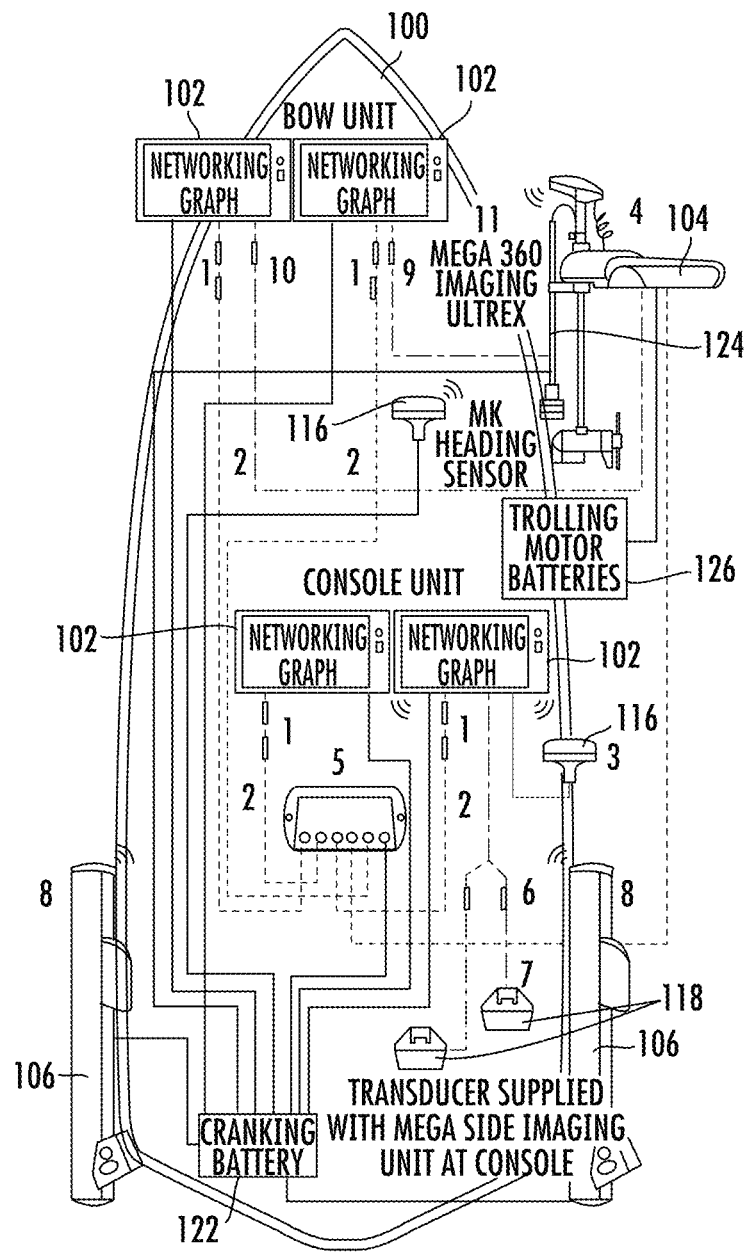
FIG. 8 is a simplified networking diagram illustrating an installation of fishing equipment configured and operated in accordance with an embodiment of the present invention having a trolling motor with i-Pilot Link and built-in MEGA Imaging, two bow-mounted fish finder units, MEGA 360 Imaging, two console-mounted fish finder units, two shallow water anchors, with heading sensor GPS puck and high-speed transducer with y-cable.

Turning now to FIG. 8, there is illustrated a simplified networking diagram for a watercraft 100 that utilizes two bow mount fish finders 102 in addition to a bow mount trolling motor 104 that includes a MEGA 360 imaging transducer 124. As with previous installations, the trolling motor 104 utilizes a dedicated trolling motor battery 126 (or bank of batteries) and receives heading information from sensor 116. This installation also includes two console mount fish finders 102, the pair of transducer assemblies 118, and a GPS and heading sensor 116. As with the other more complex installations, an ethernet switch 120 may also be used. As shown in FIG. 8, a pair of shallow water anchors 106 are utilized, and are powered from the cranking battery 122 of the watercraft 100.

Figure 9:
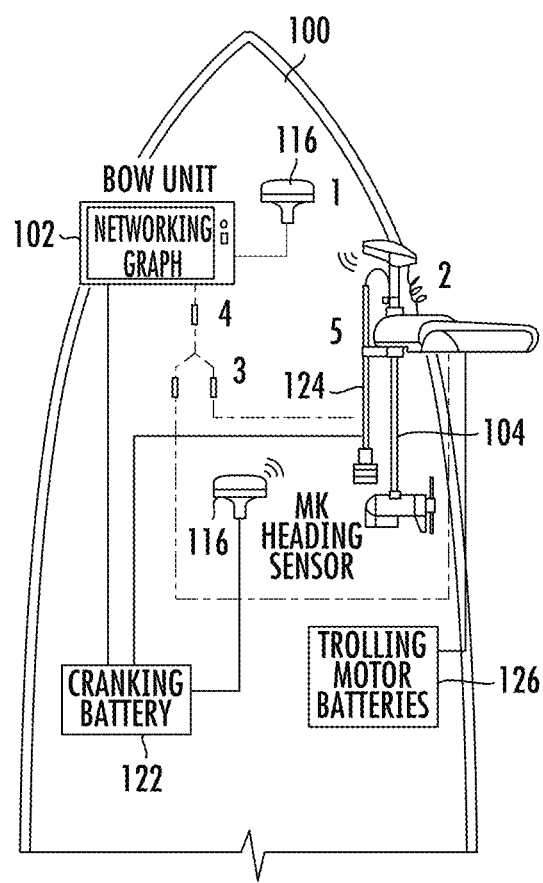
FIG. 9 is a simplified networking diagram illustrating an installation of fishing equipment configured and operated in accordance with an embodiment of the present invention having a MEGA 360 Imaging transducer unit, a bow-mounted fish finder unit and trolling motor with built-in MEGA Imaging.

FIG. 9 illustrates the forward portion of watercraft 100 having installed thereon a bow mount fish finder 102 that receives GPS and heading information from sensor 116. A bow mount trolling motor 104 that includes built-in MEGA imaging is also included in this installation, as is a MEGA 360 sonar transducer assembly 124. To enable i-Pilot operation, the trolling motor 104 also receives heading information from sensor 116, the power for which is provided by the cranking battery 122.

Figure 10:
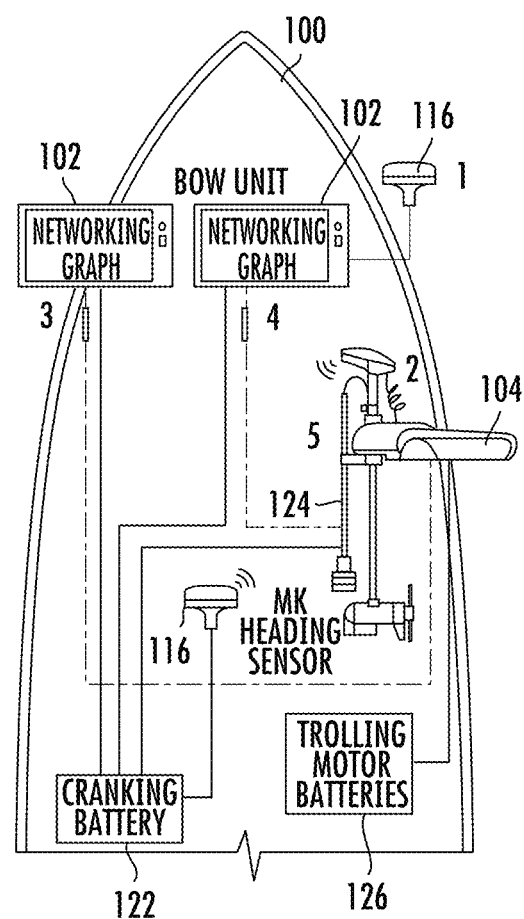
FIG. 10 is a simplified networking diagram illustrating an installation of fishing equipment configured and operated in accordance with an embodiment of the present invention having a MEGA 360 Imaging transducer unit with two bow-mounted fish finder units and a trolling motor with built-in MEGA Imaging.

In FIG. 10 a similar installation is illustrated that also includes a second bow mount fish finder 102. A bow mount trolling motor 104 that includes built-in MEGA imaging is also included in this installation, as is a MEGA 360 sonar transducer assembly 124. To enable i-Pilot operation, the trolling motor 104 also receives heading information from sensor 116, the power for which is provided by the cranking battery 122.

Figure 11:
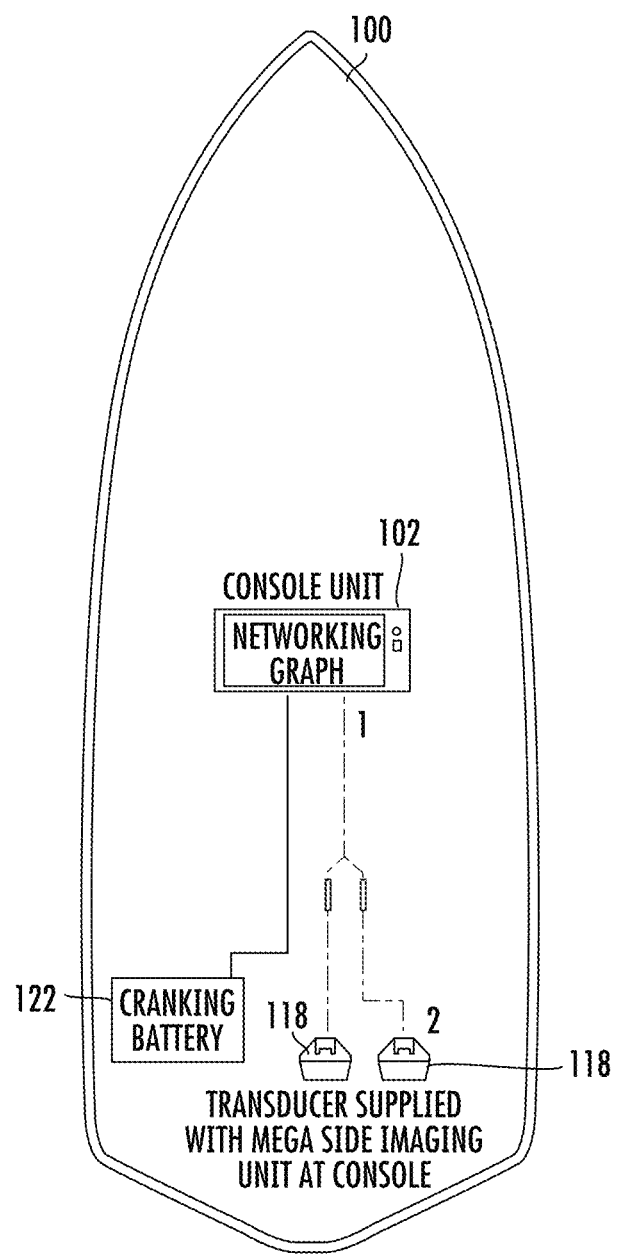
FIG. 11 is a simplified networking diagram illustrating an installation of fishing equipment configured and operated in accordance with an embodiment of the present invention having a console-mounted fish finder unit with high-speed transducer and y-cable.

FIG. 11 illustrates a simple installation utilizing a single console mount fish finder 102 coupled to a pair of transducer assemblies 118. As shown in FIG. 11, the console mount fish finder 102 is powered by the cranking battery 122 in this simple installation.

Figure 12:
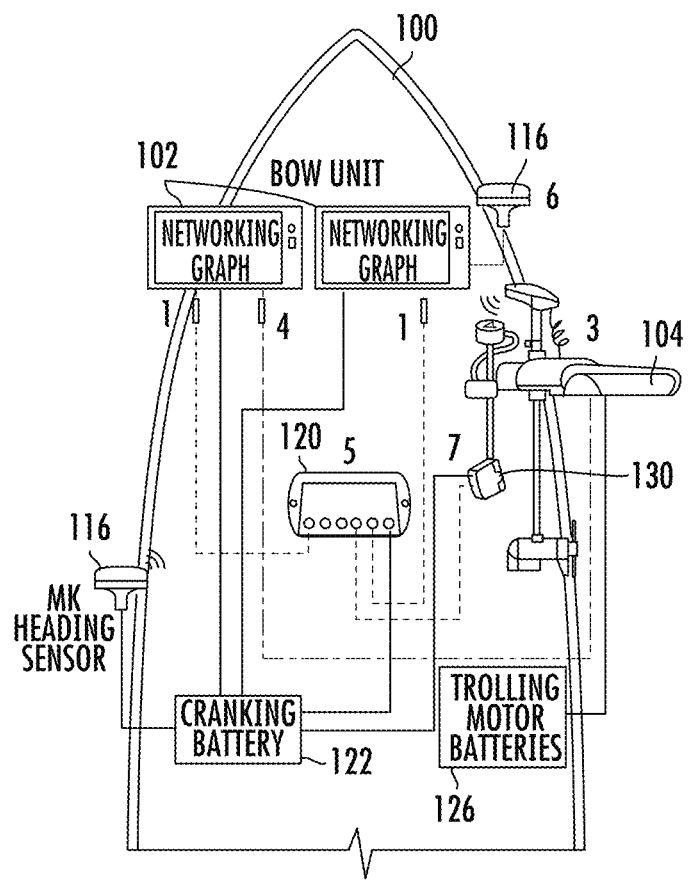
FIG. 12 is a simplified networking diagram illustrating an installation of fishing equipment configured and operated in accordance with an embodiment of the present invention having a MEGA Live Imaging transducer and a Target Lock system with two bow-mounted fish finder units and a trolling motor with built-in MEGA Imaging.

FIG. 12 illustrates the bow portion of watercraft 100 including an installation of the MEGA Live sonar transducer 130 and Target Lock system providing independent steering of the MEGA Live transducer 130 from the bow mount trolling motor 104 having built-in MEGA imaging to which it is mounted. This installation also utilizes a pair of bow mounted fish finders 102 and an ethernet switch 120. GPS and heading information are provided to the fish finders 102 via the GPS and heading sensor 116, while a dedicated trolling motor heading sensor 116 provides i-Pilot operation for trolling motor 104. As shown in this installation, the trolling motor dedicated battery 126 (or bank of batteries) powers the trolling motor while the remaining electronic marine equipment is powered by the cranking battery 122.

Figure 13:
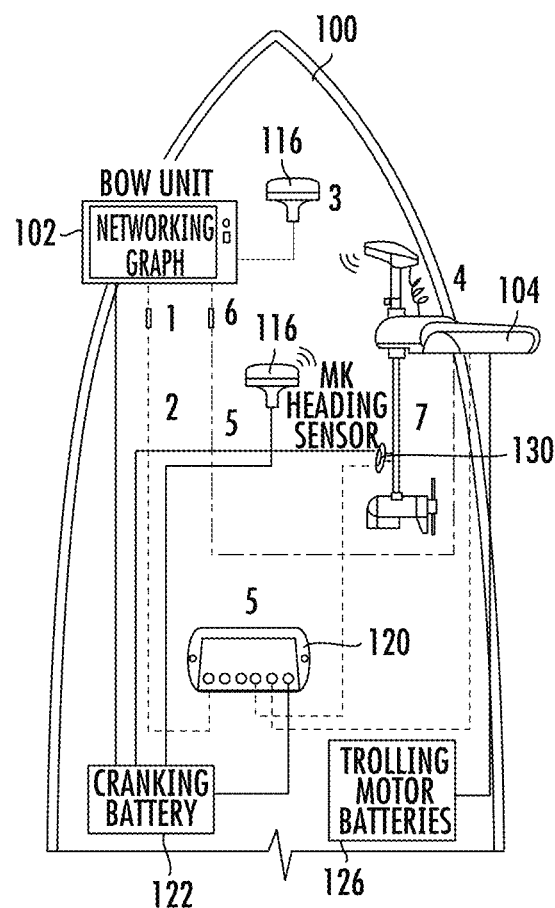
FIG. 13 is a simplified networking diagram illustrating an installation of fishing equipment configured and operated in accordance with an embodiment of the present invention having a MEGA Live Imaging transducer with a bow-mounted fish finder unit and a trolling motor with built-in MEGA Imaging.

The installation of FIG. 13 only utilizes a single bow mount fish finder 102 with a dedicated GPS and heading sensor 116. The bow mount trolling motor 104 also includes the MEGA Live transducer assembly 130 and the integrated MEGA Imaging transducer assembly. Heading information is provided by the dedicated trolling motor heading sensor 116 to enable i-Pilot operation, and ethernet switch 120 is utilized to properly network each of the components. The trolling motor continues to rely on a dedicated trolling motor battery 126 (or bank of batteries), while the remaining marine equipment is powered from cranking battery 122.

Figure 14:
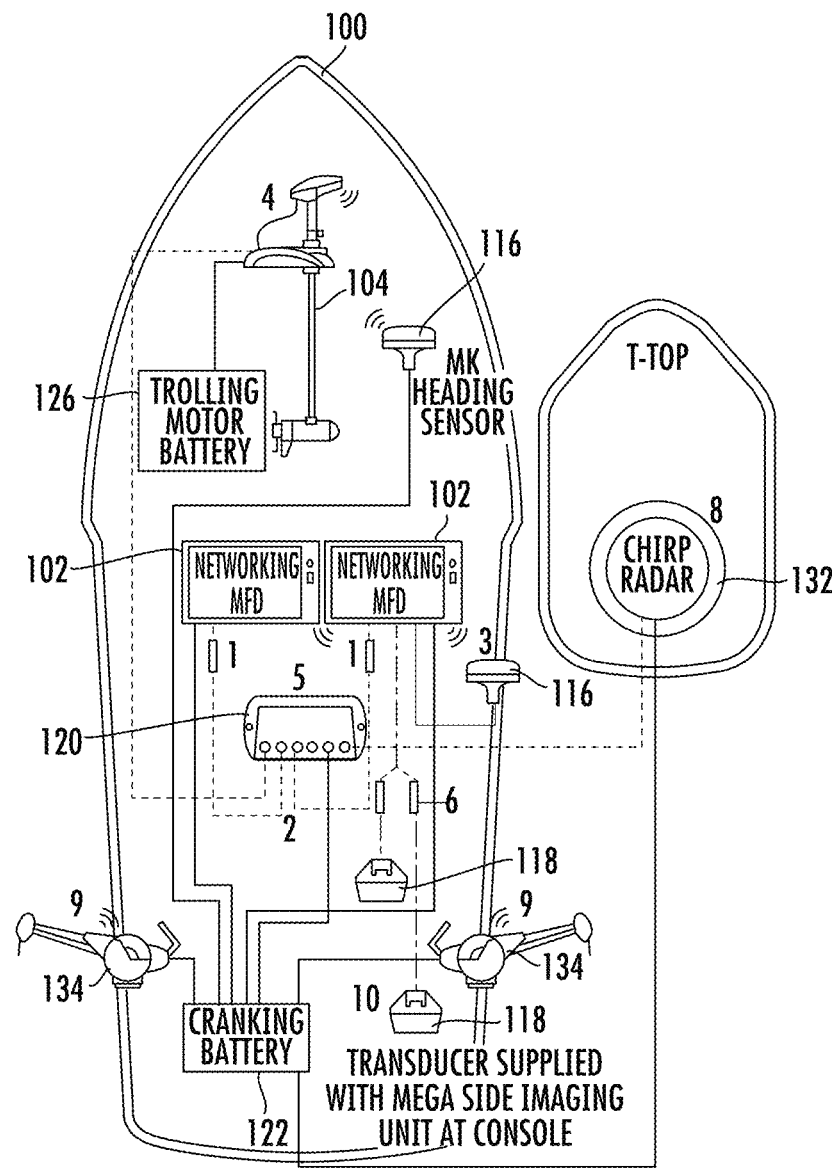
FIG. 14 is a simplified networking diagram illustrating an installation of fishing equipment configured and operated in accordance with an embodiment of the present invention having a trolling motor with i-Pilot Link, two console-mounted fish finder units, a CHIRP radar, two downriggers, with heading sensor GPS puck and high-speed transducer with y-cable.

The installation illustrated in FIG. 14 includes a chirp radar 132 mounted on the T-top of the watercraft 100. A pair of down riggers 134 are also included in this installation. As illustrated, the bow mount trolling motor 104, utilizing a dedicated trolling motor battery 126 (or bank of batteries) and heading sensor 116, is also included. A pair of console mounted fish finders 102 are included and receive information from the GPS and heading sensor 116 as well as the pair of high-speed transducer assemblies 118. Other than the trolling motor 104 which includes its own dedicated trolling motor battery 126 (or bank of batteries), the remaining marine equipment in this installation is powered from the cranking battery 122.

Figure 15:
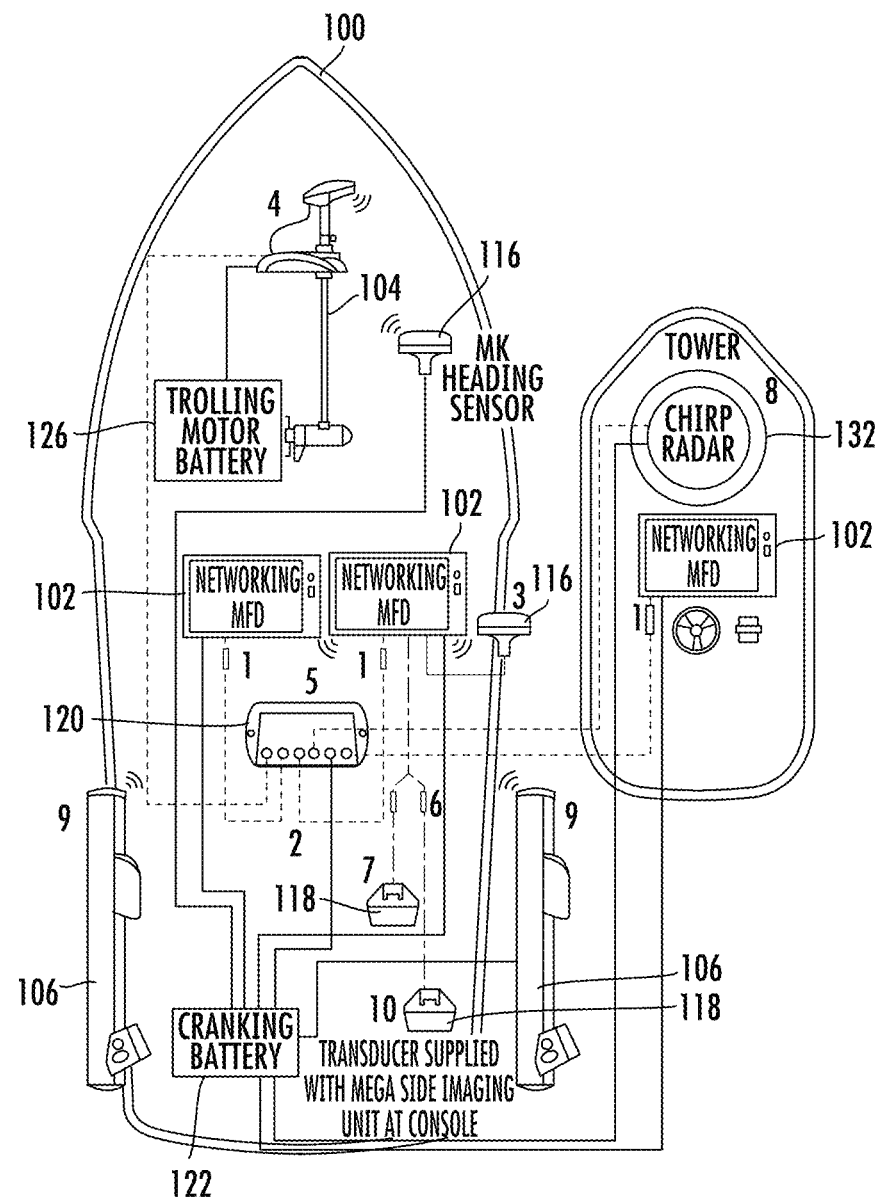
FIG. 15 is a simplified networking diagram illustrating an installation of fishing equipment configured and operated in accordance with an embodiment of the present invention having a trolling motor with i-Pilot Link, two console-mounted fish finder units, a fish finder unit at second station, a CHIRP radar and two shallow water anchors.

In the installation illustrated in FIG. 15, a third fish finder 102 is included on the power station of the watercraft 100 along with the chirp radar 132. This installation also includes a pair of shallow water anchors 106. As shown, the pair of console mounted fish finders 102 receive input from the GPS and heading sensor 116 as well as sonar information from the high-speed transducer assemblies 118. This network configuration also includes an ethernet switch 120. The cranking battery 122 provides power to the marine equipment on this illustrated installation except for the trolling motor which includes its own dedicated battery 126 (or bank of batteries).

As should now be apparent from the foregoing, the One Boat Network (OBN) User Interface (UI) for configuration and control of certain embodiments of the present invention may be provided by and includes any or all of the fish finder 102 Multi-Function Display (MFD), the One Boat Network App (OBN App) on a mobile device 114, the i-Pilot Link Remote 108, etc.

With regard to the low power mode introduced above, an angler uses the OBN UI to configure and enable this low power mode. In certain embodiments the user is able to configure the low power mode to include the following: at what battery level should low power mode be activated; should the trolling motor also go into low power mode; do any of the MFDs change brightness; do any of the MFDs go into standby mode, etc. Depending on the network configuration and angler preferences, the trolling motor batteries, any dedicated batteries for other marine equipment installed on the boat, and the cranking (starting) batteries may all, each, or a subset be monitored, and the controls programmed as part of the low power mode are available for each of these electrical systems. The programming for each electrical system regarding what actions to take when entering this low power mode may vary based on the marine equipment in each, or may share program settings across systems with effect only on the included marine equipment in each.

In one embodiment, the system and method determine battery capacity by using the OBN UI to determine the battery type lithium (Li) based or lead (Pb) based and to determine the battery capacity. The system and method then use a percentage of full battery capacity and create a 100% to 0% scale for the battery fuel gauge to be displayed to the anger via the OBN UI. In an embodiment the battery open circuit voltage, with the trolling motor in the off state with only the trolling motor control boards beings on, is measured. From this measurement the battery state of charge can be estimated on Pb batteries. The system then monitors motor current and subtracts off amp-hours from total capacity to determine fuel gauge level and estimated run time at current settings during operation.

For lithium batteries the angler uses the OBN UI to input battery capacity in amp-hours. All of the current lithium manufactures provide a capacity rating in amp-hours. In one embodiment the system uses 90% of battery capacity in amp-hours for determining the "fuel level" from 100% down to 0% for the gauge level to be displayed to the angler. The challenge for lithium batteries is that the discharge voltage is very flat until the battery is nearly completely discharged. In view of this, in one embodiment the system assumes that at the beginning of every day the battery is fully charged, and thereafter utilization of the battery will cause the gauge to display a reduction from the assumed 100% starting level.

Recognizing that the MFD controlling this operation could be powered down during mid-day transports, in one embodiment the system would store upon power down and then recall the last known battery state of charge upon power up. In certain embodiments, the selection between the two of these operating parameters could be made by the angler via the OBN UI. Because the batteries may have been charged or swapped during a period of power off of the MFD, an embodiment of the present invention utilizes a fuel gauge reset on the MFD that the angler can select after the batteries are charged or fully charged batteries are connected.

Based on trolling motor current draw the used amp-hours can be subtracted from the remaining battery capacity. As an example, assume a battery has a rating of 100 amp-hours, which equates to 360,000 amp-seconds. In an embodiment using a 90% margin, the battery gauge will display full capacity based on 90 amp-hours, or 324,000 amp-seconds. If the system monitors 10 amps over a 1 second interval, the gauge will report the remaining charge in the battery of 323,990 amp-seconds (324,000 amp-seconds-10 amp-seconds).

For flooded lead acid or AGM batteries, the lead battery manufactures do not have a consistent method for providing battery capacity or specifications. As such, the OBN UI provides a plurality of options to be selected by the angler based on the following battery specifications. The angler can enter the 20 hour rate in amp hours, or the angler may enter two battery discharge rates and the system will then calculate the 20 hours rate using Peukert's Law. In such embodiment, the angler enters a first rate and the battery discharge time in hours at that given amp-hour rate, and the angler enters the second rate and the battery discharge time in hours at that second amp-hour rate.

For example, rates given by a battery manufacture may specify a 5 hour rate=>85 amp-hours and a 10 hour rate=>97 amp-hours. The system determines battery discharge currents: t1=85 amp-hours/5 hour=17 amps; t2=97 amp-hours/10 hours=9.7 amps. The system then calculates k (Puekert's constant for this battery): k=(log t1-log t2)/(log I2-log I1); k=(log 5-log 10)/(log 9.7-log 17); k=1.235. The angler can pick one of the ratings, e.g.: 97 amp-hours/10 hours, and the system will then calculate the capacity. That is, to determine the 20 hour rate (Q is battery capacity): Q=Q1*(t/t1) $\wedge$((k-1)/k); Q=97*(20/10)/$\wedge$(0.191); Q=110.73 amp-hours (20 hour capacity).

Once the two battery discharge rates are entered, then the MFD calculates the 20 hour rate using Peukert's law: Rate 1: current in amps and battery discharge time in hours; Rate 2: current in amps and battery discharge time in hours. Given by battery manufacture: 25 AMP at 175 min=2.917 hours; 75 AMP at 45 min=0.75 hours. Calculate k->Puekert's constant for this battery: k=(log t1-log t2)/(log I2-log I1); k=(log 2.917-log 0.75)/(log 75-log 25); k=1.236.

If the angler does not have any information on battery ratings, the system in one embodiment will assume 100 amp-hours and will use 80% of that battery capacity in amp-hours for determining the fuel gauges, 100% down to 0%.

The challenge with Pb based batteries is that as the current draw goes up on the battery, the amount of amp-hours recovered from the battery goes down, as demonstrated with Peukert's law. Recognizing this, the system and method of one embodiment tracks or learns the performance of the battery over time and if it is changing. If performance of battery goes down, then the system provides a notification or warning to the angler, who may then decide to replace or adjust the loading of the battery, check any new wiring, run a deep cycle charge or repair mode on the batteries, etc.

Such performance is determined in different embodiments using different methods, at least some using the motor voltage and current values from the trolling motor. In one embodiment, the system fully calculates Peukerts equations to determine this information. In other embodiments, this function is estimated by multiplying the current by a different factor depending on the amount of current that was being drawn from the battery. That is, if the motor current is between 0 and 20 A then multiply current by 1, if the motor current is between 20 A and 40 A then multiply current by a different factor, e.g. 1.2, and if the motor current is higher than 40 A then multiply by a further different factor, e.g. 1.5.

As an example, the battery rating is determined at 100 amp-hours->360,000 amp-seconds. The battery gauge is then based on 80 amp-hours->288,000 amp-seconds. The open circuit voltage on the battery is read as, e.g. 12.45 V in this example. Therefore, the current state of charge and fuel gauges would be at 288,000 amp-seconds* 60%=172,800 amp-seconds. If the system then monitors 25 amps over a 1 second interval, then the remaining charge in the battery would equal 172,800-25 amps-seconds *1.2=172,770 amp-seconds.

In addition to the benefits provided by knowing the voltage and motor current measurements at the motor as just discussed, knowledge of the voltage at the battery 126 (or bank of batteries) at the same time provides additional information from which embodiments of the present invention can control the system and inform the anger of the status thereof. In one embodiment, the system and method provide the angler with information from which the angler should investigate to determine if the boat has weak batteries or potential boat wiring issues. This feature can be accomplished via an OBN battery charger or OBN battery voltage monitoring system connected to the battery 126 and/or battery 122.

FIG. 16 illustrates an embodiment utilizing a networked battery charger 138 that is used in an embodiment of the present invention to charge and/or monitor the bank of batteries $126_1$, $126_2$, and $126_3$ used to power the trolling motor 104. This same battery charger 138 or monitor, in certain embodiments, may also charge and/or monitor the cranking battery 122, or it may be a separate battery charger (not shown). Data is collected by the fish finder 102 (or other smart device on OBN) from the battery charger 138 (or voltage monitor) and from the trolling motor 104.

Because anglers may use different combinations of batteries to power the marine equipment installed on the watercraft, in one embodiment, within the OBN app, on the fish finder, or other smart device on the network, the angler inputs which batteries are used for which marine devices. In the system shown in FIG. 16, the angler would indicate that Bat 1 ($126_1$), Bat 2 ($126_2$), and Bat 3 ($126_3$) are used to power the trolling motor 104 and that Bat 4 (122) is used to power the fish finder 102 (and/or cranking (starting) system of the watercraft). Of course more or fewer batteries may be used for the illustrated and/or different pieces of marine equipment as the angler may choose.

To illustrate operation of the embodiment of FIG. 16, the following scenarios are used:

TABLE 1

|  | Scenario 1 | Scenario 2 | Scenario 3 |
| --- | --- | --- | --- |
| Trolling Motor Current | 20 A | 35 A | Does Not Matter |
| Voltage at Bat 1 | 12.2 V | 9.5 V | 12.2 V |
| Voltage at Bat 2 | 12.2 V | 9.5 V | 10.7 V |
| Voltage at Bat 3 | 12.2 V | 9.5 V | 12.2 V |
| Voltage at Trolling Motor | 35.5 V | 28.2 V | Does Not Matter |

For Scenario 1, the fish finder 102 collects 36.6 V across all three batteries $126_1$, $126_2$, and $126_3$ (via information from the battery charger or power monitor 138) and 35.5 V at the trolling motor 104 (via information from the trolling motor 104), with a relatively light current draw of 20 A. In this scenario the fishfinder 102 or other OBN devices would calculate a 1.1 V drop from the batteries $126_1$, $126_2$, and $126_3$ to the trolling motor 104 (i.e., 36.6V−35.5V=1.1V). With this voltage drop at a current draw of 20 A, the fish finder 102 calculates a 22 W power loss in the wiring (i.e., 1.1 V*20 A=22 W). The fish finder then compares that calculated power loss to a preset (or angler defined) limit and provides a warning to the angler that there may be a wiring issues that should be investigated when the calculated power loss exceeds that limit.

In Scenario 2, the fish finger 102 collects 28.5 V across all three batteries $126_1$, $126_2$, and $126_3$ (via information from the battery charger 138) and 28.2 V at the trolling motor 104 (via information from the trolling motor 104), with a moderate current draw of 35 A. Here, the calculated power loss in the wiring is within acceptable limits, but the battery levels are lower than expected. In such a scenario, the fish finder 102 provides a warning to the angler of low batteries $126_1$, $126_2$, and $126_3$. This could be the result of the angler not having charged them fully or that they could possibly be week.

In one embodiment this diagnostic analysis continues to determine which of these two issues may be present. Specifically, the fish finder 102 may evaluate additional information from the battery charger 138 regarding the last charging profile and state of the batteries $126_1$, $126_2$, and $126_3$. If the information from the battery charger 138 from the last charging profile indicates that the batteries accepted a good charge, the batteries are in a good state, then the fish finder determines the expected state of charge. This information is compared to the actual state of charge. If this difference is greater than a preset or angler set limit, then a warning is issued to the angler that battery system should be evaluated and the batteries $126_1$, $126_2$, and $126_3$ may need to be replaced to maintain peak performance of electrical system.

In Scenario 3, the trolling motor 104 current and voltage are not important. Instead, the fish finder can determine from the individual voltages at each battery $126_1$, $126_2$, and $126_3$, that a problem exists. That is, the fish finder 102 determines that one battery $126_2$ is lower than the other two batteries $126_1$ and $126_3$. If the difference in voltage exceeds a predetermined or angler set threshold, then the fish finder 102 will warn the angler that the batteries should be evaluated. While only one of the three batteries is low, it is often recommended that all three trolling motors batteries should be replaced so that the same type, manufacture and age are the same. Otherwise, differences in state of charge, etc. may turn out to be simply the different age, etc. of the different batteries, and not a problem that would otherwise suggest a replacement.

The same battery voltage calculations and warnings are also provided in an embodiment for the fishfinder 102 battery 122. This is because the fish finder 102 knows the voltage at the battery 122 via information from the battery charger 138, and at the fishfinder 102 from its own internal circuitry.

This battery capacity information is also useful as it allows the angler to select an appropriate trolling motor control mode or to rule out certain other modes. In embodiments utilizing an inverter-driven brushless trolling motor or a brushed trolling motor, speed control and power utilization may be adjusted automatically by the motor control board based on the selected operating mode.

In an ECO-MODE the angler selectable speed settings may be controlled by the motor control board to provide a moderate power utilization in the middle of the available power band of the motor and to control the speed ramp up to the selected speed that does not result in a current spike that might degrade overall performance. As such, this ECO-MODE optimizes performance for maximum trolling system efficiency in moderate fishing conditions.

In another embodiment a LOW POWER MODE is provided that reduces performance to the bottom of the available power band of the motor in order to maximize remaining desired on-water time. That is, the inverter is controlled by the motor control board to utilize lower power for each selected user speed setting, e.g. whereas a "5" speed setting in the ECO-MODE may be a midpoint of the maximum available power utilization, the same "5" speed setting in the LOW POWER MODE may equate to a quarter of this maximum available power utilization.

In a still further embodiment, a BEAST MODE is provided that optimizes performance for extreme fishing conditions (high wind, strong tidal current, river fishing, open water trolling). In this mode the inverter is controlled by the motor control board to provide increased performance at the top of the available power band of the motor. In such a BEAST MODE, the same "5" setting for trolling motor speed may equate to three-quarters of the maximum available power utilization.

In other words, the three trolling motor modes just discussed utilize different segments of the total power band to adjust trolling motor performance and power consumption based on angler preferences. As an example, if the normal (non-MODE) power band ranges from zero to ten, i.e. angler selectable speed settings, wherein zero is no power and ten is maximum available power, then the LOW POWER MODE may provide the zero to ten selectable speed settings over the bottom half of the normal (non-MODE) power band. Such would result in, e.g. an angler selected speed setting of "10" in LOW POWER MODE would equate to the power utilization of a "5" in the normal (non-MODE) power band.

Similarly, the ECO-MODE would provide the zero to ten angler selected speeds over the middle half of the normal (non-MODE) power band, e.g. an ECO-MODE speed selection of "10" would equate to the power utilization of a "7.5" in the normal (non-MODE) power band. In the BEAST MODE, a speed selection of "10" would equate to the maximum power delivery, i.e. a "10" in the normal (non-MODE) power band, and the minimum speed selection would equate to a "5" in the normal (non-MODE) power band.

In other embodiments, the overlap of the various MODES across the available power band is eliminated by dividing such power band in non-overlapping sub-bands, e.g. in thirds for the three modes discussed above. The user speed selection options would still range from, e.g., zero to ten, but the actual output to the trolling motor, and therefore the trolling motor performance, would be different based on the selected mode.

In still other embodiments, the angler can "customize" the speed of the trolling motor to his or her preference at each speed setting. As an example, an angler could set a range from 100-300 rpm to correspond to a speed setting of 2, etc. Such customized trolling motor speed ranges for each speed setting on the controller can be overlapping or non-overlapping at the angler's desire. Besides allowing an angler to set the trolling motor speed for each speed setting, such embodiments allow, e.g., an angler to reduce the total number of different speed settings from the number (e.g. ten) provided on the speed controller to effectively a smaller number (e.g. only three).

Such an embodiment is beneficial to an angler who does not want such fine speed adjustment provided by the controller speed settings and instead prefers only (e.g. three) coarse adjustments. In such an example, the angler can select the different speeds simply by turning the speed controller, e.g., all the way down, somewhere/anywhere in the middle, and all the way up. Such a completely configurable speed control allows the angler to select the desired speed modes without having to look at the speed setting number on the speed controller, but instead by simply using rough or coarse adjustments by feel.

Beyond using the motor control board to adjust the trolling motor speed based on an angler selection, in a further embodiment a TROLLING MODE is provided that takes advantage of the networked fish finder, downriggers, and temperature at depth sensors, to automatically adjust surface trolling speed, i.e. the motor control board output, for optimal bait presentation at depth.

Embodiments of the system of the present invention also recognize that the use of an inverter driven brushless trolling motor allows for operation of the trolling motor as a generator by operating the inverter in a different quadrant in situations where the water current (or air current when deployed while trailering) can provide the mechanical energy to drive the propeller. That is, in certain embodiments, the inverter may be controlled to provide regeneration of the batteries in situations when the trolling motor is deployed, and the trolling motor propeller is driven by the water (or air) current. Such situations may occur, e.g., when the watercraft is anchored in a river or other area of moving water relative to the motor, when the watercraft is propelled by the main gasoline powered engine (recharging particularly for the separate batteries used for powering the electronic fishing equipment that are not connected to the alternator of the main engine), when trailering the watercraft to, from, or between fishing locations, etc. Further, with appropriate know circuitry, such regeneration is also available with a brushed motor.

The power generated in such situations varies based on current flow across the propeller, and some embodiments utilize stiffer motor shafts and bracketing if to be used under main engine power. Long term "trickle" charging for installations, e.g. pontoon boats docked on a river, may be optimized by fitting the trolling motor with a specialized propeller for such usage.

Also as introduced above, embodiments of the present invention include a shallow water anchor down mode, also known as an extreme spot lock mode. In embodiments when the angler is operating only a single shallow water anchor, the boat may pivot on the single anchoring point. If a trolling motor is also deployed, the system will turn the trolling motor so the thrust would be perpendicular to the keel of the boat. Using the on-board compass (either the MFD or trolling motor compass) the trolling motor is run in forward or reverse (either by reversing the motor or turning it 180°) to maintain boat orientation on the pivot point of the shallow water anchor. In an alternate embodiment, the trolling motor is only run in a single direction and the orientation is changed to provide the proper clockwise or counterclockwise movement of the boat relative to the pivot point of the shallow water anchor.

The deep weeds mode is provided in embodiments that include a trolling motor platform that implements a motor soft start feature. The purpose of the soft start features is to allow the trolling motor to have a controlled and smooth ramp up speed. This is most noticeable when the motor is set to a high speed and then the prop is enabled. The motor will ramp the speed from 0 to the target setting over short durations of time. Unfortunately, soft start can be a hinderance when fishing in weed choaked areas, such as while bass fishing, and cause weeds to become more easily entangled on and around the lower unit. Such entangled weeds can prevent the motor from ramping up to its full power capacity, possibly resulting in the trolling motor controller going into current limit and shutting down a few seconds later. This mode gives the angler the ability to change the soft start ramp rate so as to minimize such entanglement.

In certain embodiments the species select mode is provided, recognizing that repeatability of successful fishing patterns is key to the success of an angler. Species select mode is a dynamic, "learning" mode wherein the system catalogues critical elements contributing to a successful pattern. The OBN system logs location, speed, heading and water temperature, automatically or each selectable by the user. The OBN UI allows the angler to input variable data including what species is being targeted, for example "Walleye." The OBN system presents the angler with shortcuts to "Species Select" options that refer back to data tables that reference prerecorded variables observed during earlier recordings. Once enable by the angler, the system provides repeatability of optimal speeds and methods that targeted predetermined specific species during prior outings.

As an example use-case scenario, assume an angler is targeting Walleye, and has executed the Species Select "Learn" function. The angler is then trolling for Walleye at a 273° heading, at 1.1 mph speed over ground (SOG), at certain GPS coordinates, in water that is 68° F. During the learn period, the system is logging the characteristics of this fishing session. At the conclusion of the fishing session, the angler is presented with options to manually enter certain data to which the system would not have visibility, e.g., bait presentations used, general weather conditions, species caught including size and quantity. Once this recorded session is complete, the Mode would be saved for the user to return to at a later time.

The next time the angler is out targeting Walleye, he or she would be able to choose the "Species Select Mode", wherein the angler would be presented with all of the various species select recordings that were previously made. Whichever selection is made (in this case, Walleye) the system would be "replay" the select set of variables that were previously recorded for that species.

In the current versions of spot lock that cancel the lock when the angler makes adjustments to the boat position using the foot pedal or any other of the OBN UIs, the angler is required to re-enable the spot lock once moved. In embodiments of the present invention, however, the river/current spot lock mode operates differently than the current spot lock. When adjustments are made to the boat position using the foot pedal or other OBN UIs, the spot lock is automatically re-enabled. This eliminates the undesired movement of the boat while the angler spends time reenabling spot lock in prior systems.

The auto stow for transport/auto deploy on arrival mode the watercraft's ignition systems to determine whether it has been turned on or off. When the ignition is sensed turned to the on state, then the trolling motor is stowed and certain MFDs are placed in the off or sleep mode to conserve power. Such actions may be automatically applied to networked marine devices, and in other embodiments the angler may select which marine devices should be controlled and the desired action. The inverse is done in certain embodiments when the watercraft's ignition is turned off in a ready to fish environment, and in other embodiments such action is limited by sensed location knowledge from the GPS position information. That is, if the system knows that the ignition was turned off at a known location, e.g. a boat ramp, on land, etc., the deployment mechanisms are disabled because the angler is not in a ready to fish environment.

Such environment information may be entered by the angler using the OBN UI to configure the location features of the transport/arrival mode. Then angler can set a home dock location for use by the system via the MFD mapping data to disable this mode near that set location and/or public boat landings, etc. In other embodiments the angler can set other user defined locations where this mode is disabled or where different actions are taken, e.g. whether the trolling motor or the shallow water anchor(s) is deployed. The transport settings (ignition detected as on) allow the angler to set desired actions with regard to the networked marine equipment, e.g., whether the shallow water anchor is retracted, the trolling motor stowed, which MFDs should be placed into sleep mode, etc. The arrival settings (ignition detected as off) also allow the angler to set desired actions with regard to the networked marine equipment, e.g., whether the shallow water anchor is deployed, the trolling motor deployed, which MFDs turn on, etc.

The shallow sense mode is used to ensure certain marine equipment is not damaged upon deployment. For example, current trolling motors with powered stow and deploy typically recall the last known trim position when the motor is deployed. If the angler was in deep water and had the motor trim extended all the way out and performed a stow operation, the deep trim setting would be saved into memory. If the boat is then transported to shallow water and the motor is deployed to the last trim position that is automatically recalled, damage may occur to the trolling motor if the trolling motor reaches the bottom of the body of water.

However, in an embodiment of the present invention, the system monitors depth information from the MFD such that the water depth is be known. When the motor is deployed the trim positions is adjusted to avoid hitting the bottom. If adequate depth is available, then no adjustment to the prior saved trim setting is done. This adequate depth may also include a fixed or angler-adjustable offset from the bottom to ensure proper operation without stirring bottom silt, etc. As an example, if the offset is set to 6 inches and the current water depth upon deployment is 36 inches, then the trolling motor would be trimmed so that the trolling motor bottom reaches 36−6=30 inches down.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of situationally controlling marine devices connected via a one boat network (OBN) on a watercraft, the marine devices selected from a group consisting of fishfinders or other OBN devices, trolling motors, heading sensors, main propulsion engine, i-Pilot Link, shallow water anchors, Automatic Identification System/Mini-automatic radar plotting aid (AIS/MARPA), smart charger or power monitor, downriggers, trim tabs, drift paddles, lighting, sonar and imaging transducers, chart plotters, foot pedals, handheld remote controls, MEGA Live Target Lock system, and mobile marine apps, comprising the steps of:

identifying at least one situational condition of at least one first marine device;

identifying at least one second marine device;

triggering a situational control action for the at least one second marine device when the at least one situational condition for the at least one first marine device is met.

2. The method of claim 1, wherein the step of identifying the at least one situational condition comprises the step of identifying whether the at least one first marine device is at least one of deployed, stowed, connected, disconnected, on, off, pinging, transmitting, rotating, indicating a time before sunrise, indicating a time after sunset, waypoint marked, spot lock marked, spot locked, target locked, or identifying a predetermined GPS location.

3. The method of claim 1, wherein the step of triggering the situational control action for the at least one second marine device when the at least one situational condition for the at least one first marine device is met comprises the step of triggering the at least one second marine device to at least one of enter a standby mode, wake-up, turn on, turn off, transmit, ping, deploy, stow, mark a waypoint, go to a waypoint, spot lock, target lock, sweep mode, home mode, trolling motor sync, target lock sync mode, increase depth, decrease depth, increase speed, or decrease speed.

4. The method of claim 1, wherein the step of identifying at least one second marine device comprises the step of grouping at least two second marine devices into a functional fishing group, and wherein the step of triggering the situational control action comprises the step of triggering a marine device specific situational control action for each of the at least two second marine devices in the functional fishing group.

5. The method of claim 4, wherein the step of triggering the marine device specific situational control action for each of the at least two second marine devices comprises the step of triggering a same marine device specific situational control action for each of the at least two second marine devices.

6. The method of claim 4, wherein the step of triggering the marine device specific situational control action for each of the at least two second marine devices comprises the step of triggering a different marine device specific situational control action for each of the at least two second marine devices.

7. The method of claim 4, wherein the step of triggering the marine device specific situational control action for each of the at least two second marine devices comprises the step of triggering a different marine device specific situational control action for at least one of the at least two second marine devices.

8. The method of claim 4, wherein the step of grouping at least two second marine devices into the functional fishing group comprises the step of grouping at least two second marine devices into different functional fishing groups based on different situational conditions of the at least one first marine device.

9. The method of claim 8, wherein the step of grouping at least two second marine devices into different functional fishing groups comprises the step of grouping different second marine devices into each of the different functional fishing groups.

10. The method of claim 8, wherein the step of grouping at least two second marine devices into different functional fishing groups comprises the step of grouping at least some same second marine devices into at least two of the different functional fishing groups.

11. The method of claim 8, wherein the step of grouping at least two second marine devices into different functional fishing groups comprises the step of grouping the same second marine devices into at least two of the different functional fishing groups, and wherein the step of triggering the marine device specific situational control action for each of the at least two second marine devices in each of the different functional fishing groups comprises the step of generating different marine device specific situational control actions based on at least one of species for which an angler is fishing, time of day, location, or environmental conditions.

12. The method of claim 1, wherein the step of identifying the at least one situational condition of the at least one first marine device comprises the step of identifying that the trolling motor is deployed, wherein the step of identifying the at least one second marine device comprises the step of identifying a console mounted fishfinder or other OBN devices and a bow mounted fishfinder or other OBN devices, and wherein the step of triggering the situational control action for the at least one second marine device when the at least one situational condition for the at least one first marine device is met comprises the step of causing the console mounted fishfinder or other OBN devices to enter a standby mode of operation and causing the bow mounted fishfinder or other OBN devices to enter a normal mode of operation.

13. The method of claim 1, wherein the step of identifying the at least one situational condition of the at least one first marine device comprises the step of identifying that the trolling motor is stowed, wherein the step of identifying the at least one second marine device comprises the step of identifying a console mounted fishfinder or other OBN devices and a bow mounted fishfinder or other OBN devices, and wherein the step of triggering the situational control action for the at least one second marine device when the at least one situational condition for the at least one first marine device is met comprises the step of causing the console mounted fishfinder or other OBN devices to enter a normal mode of operation and causing the bow mounted fishfinder or other OBN devices to enter a standby mode of operation.

14. The method of claim 1, wherein the step of identifying the at least one situational condition of the at least one first marine device comprises the step of identifying that the fishfinder or other OBN devices indicates a time before sunrise and after sunset and a speed over ground of less than a predetermined speed, wherein the step of identifying the at least one second marine device comprises the step of identifying the lighting for anchoring and wherein the step of triggering the situational control action for the at least one second marine device when the at least one situational condition for the at least one first marine device is met comprises the step of turning on the lighting for anchoring.

15. The method of claim 1, wherein the step of identifying the at least one situational condition of the at least one first marine device comprises the step of identifying that the fishfinder or other OBN devices indicates a time before sunrise and after sunset and a speed over ground of more than a predetermined speed, wherein the step of identifying the at least one second marine device comprises the step of identifying the lighting for anchoring and the lighting for navigation, and wherein the step of triggering the situational control action for the at least one second marine device when the at least one situational condition for the at least one first marine device is met comprises the step of turning on the lighting for anchoring and turning on the lighting for navigation.

16. The method of claim 1, wherein the step of identifying the at least one situational condition of the at least one first marine device comprises the step of identifying that the fishfinder or other OBN devices indicates a time before sunrise and after sunset and that the shallow water anchor is deployed, wherein the step of identifying the at least one second marine device comprises the step of identifying the lighting for anchoring and wherein the step of triggering the situational control action for the at least one second marine device when the at least one situational condition for the at least one first marine device is met comprises the step of turning on the lighting for anchoring.

17. The method of claim 1, wherein the step of identifying the at least one situational condition of the at least one first marine device comprises the step of identifying that the fishfinder or other OBN devices indicates a time before sunrise and after sunset and that the shallow water anchor is stowed, wherein the step of identifying the at least one second marine device comprises the step of identifying the lighting for anchoring and the lighting for navigation, and wherein the step of triggering the situational control action for the at least one second marine device when the at least one situational condition for the at least one first marine device is met comprises the step of turning on the lighting for anchoring and turning on the lighting for navigation.

18. The method of claim 1, wherein the step of identifying the at least one situational condition of the at least one first marine device comprises the step of identifying that the sonar and imaging transducers for live sonar is pinging, wherein the step of identifying the at least one second marine device comprises the step of identifying the sonar and imaging transducers for side imaging sonar and down imaging sonar, and wherein the step of triggering the situational control action for the at least one second marine device when the at least one situational condition for the at least one first marine device is met comprises the step of turning off the sonar and imaging transducers for side imaging sonar and down imaging sonar.

19. The method of claim 1, wherein the step of identifying the at least one situational condition of the at least one first marine device comprises the step of identifying that the main propulsion engine is started, wherein the step of identifying the at least one second marine device comprises the step of identifying the trolling motor, the shallow water anchor, bow mounted fishfinder or other OBN devices, sonar and imaging transducers for live imaging, sonar and imaging transducers for 360° imaging, and wherein the step of triggering the situational control action for the at least one second marine device when the at least one situational condition for the at least one first marine device is met comprises the steps of turning off and stowing the trolling motor, retracting the shallow water anchor, placing the bow mounted fishfinder or other OBN devices in standby mode, turning off the sonar and imaging transducers for live imaging, and turning off the sonar and imaging transducers for 360° imaging.

20. The method of claim 1, wherein the step of identifying the at least one situational condition of the at least one first marine device comprises the step of identifying that the main propulsion engine is turned off, the fishfinder or other OBN devices indicates that the watercraft is located on water at a fishing location that is not at a dock, wherein the step of identifying the at least one second marine device comprises the step of identifying the trolling motor, the shallow water anchor, bow mounted fishfinder or other OBN devices, bow mounted sonar and imaging transducers, and wherein the step of triggering the situational control action for the at least one second marine device when the at least one situational condition for the at least one first marine device is met comprises the steps of deploying the trolling motor, deploying the shallow water anchor, turning on the bow mounted sonar and imaging transducers.

21. The method of claim 1, wherein the step of identifying the at least one situational condition of the at least one first marine device comprises the step of identifying that the fishfinder or other OBN devices indicates a shallow depth and the trolling motor is deploying, wherein the step of identifying the at least one second marine device comprises the step of identifying a trim control for the trolling motor, and wherein the step of triggering the situational control action for the at least one second marine device when the at least one situational condition for the at least one first marine device is met comprises the step of controlling the trim control of the trolling motor to limit a depth of deployment to be less than the shallow depth.

22. The method of claim 1, wherein the step of identifying the at least one situational condition of the at least one first marine device comprises the step of identifying activation of the foot pedal to control the trolling motor to move the watercraft, wherein the step of identifying the at least one second marine device comprises the step of identifying the shallow water anchor, and wherein the step of triggering the situational control action for the at least one second marine device when the at least one situational condition for the at least one first marine device is met comprises the step of retracting the shallow water anchor while the foot pedal is controlling the trolling motor and deploying the shallow water anchor when the foot pedal is no longer controlling the trolling motor.

23. The method of claim 1, wherein the step of identifying the at least one situational condition of the at least one first marine device comprises the step of identifying that the heading sensor indicates that the trolling motor is pointed at an angle relative to a keel of the watercraft and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of controlling a ramp up speed of the trolling motor to reduce a risk of an angler losing balance.

24. The method of claim 1, wherein the step of identifying the at least one situational condition of the at least one first marine device comprises the step of receiving an ECO MODE selection from one of the fishfinder or mobile marine app, that a speed control input for the trolling motor on the foot pedal is set to an angler-set position, and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of allocating only a middle portion of an available speed band for the trolling motor, indexing the allocated portion to the speed control input for the trolling motor on the foot pedal, and controlling the speed of the trolling motor based on the allocated portion of the speed band indexed to the angler-set position.

25. The method of claim 1, wherein the step of identifying the at least one situational condition of the at least one first marine device comprises the step of identifying a low battery condition by the fishfinder or other OBN devices, that a speed control input for the trolling motor on the foot pedal is set to an angler-set position, and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of allocating only a bottom portion of an available speed band for the trolling motor, indexing the allocated portion to the speed control input for the trolling motor on the foot pedal, and controlling the speed of the trolling motor based on the allocated portion of the speed band indexed to the angler-set position.

26. The method of claim 25, wherein the step of triggering the situational control action for the at least one second marine device when the at least one situational condition for the at least one first marine device is met further comprises at least one of the steps of reducing a brightness of a display of the fishfinder or other OBN devices, placing a fishfinder or other OBN devices into standby, and turning off non-safety related marine devices.

27. The method of claim 1, wherein the step of identifying the at least one situational condition of the at least one first marine device comprises the step of receiving a BEAST MODE selection from one of the fishfinder or mobile marine app, that a speed control input for the trolling motor on the foot pedal is set to an angler-set position, and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of allocating only a top portion of an available speed band for the trolling motor, indexing the allocated portion to the speed control input for the trolling motor on the foot pedal, and controlling the speed of the trolling motor based on the allocated portion of the speed band indexed to the angler-set position.

28. The method of claim 1, wherein the step of identifying the at least one situational condition of the at least one first marine device comprises the step of receiving a DEEP WEEDS MODE selection from one of the fishfinder or mobile marine app, that a speed control input for the trolling motor on the foot pedal is set to an angler-set position, and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of changing a soft start speed ramp up function for the trolling motor to allow the trolling motor to achieve the speed corresponding to the angler-set position faster or slower than the soft start speed ramp up rate.

29. The method of claim 1, wherein the step of identifying the at least one situational condition of the at least one first marine device comprises the step of receiving a CUSTOM SPEED MODE selection from one of the fishfinder or mobile marine app, that a speed control input for the trolling motor on the foot pedal is set to an angler-set position, and that the foot pedal is being activated to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of allocating an angler selected portion of an available speed band for the trolling motor, indexing the allocated portion to the speed control input for the trolling motor on the foot pedal, and controlling the speed of the trolling motor based on the allocated portion of the speed band indexed to the angler-set position.

30. The method of claim 29, wherein the step of allocating an angler selected portion of an available speed band for the trolling motor comprises the step of allocating an entirety of the available speed band for the trolling motor to be indexed in overlapping ranges for each angler-set position of the speed control input for the trolling motor on the foot pedal.

31. The method of claim 29, wherein the step of allocating an angler selected portion of an available speed band for the trolling motor comprises the step of allocating portions of the available speed band for the trolling motor to be indexed to multiple angler-set positions of the speed control input for the trolling motor on the foot pedal.

32. The method of claim 29, wherein the step of allocating an angler selected portion of an available speed band for the trolling motor comprises the step of selecting a specific trolling motor speed to be indexed to each angler-set positions of the speed control input for the trolling motor on the foot pedal.

33. The method of claim 1, wherein the step of identifying the at least one situational condition of the at least one first marine device comprises the step of identifying activation of the foot pedal to control the trolling motor to move the watercraft, identifying that the downriggers are set to a depth of between fifteen and forty feet, and that temperature at depth sensors indicate water temperature of between approximately forty to sixty-five degrees, wherein the step of identifying the at least one second marine device comprises the step of identifying the trolling motor, and wherein the step of triggering the situational control action for the at least one second marine device when the at least one situational condition for the at least one first marine device is met comprises the step of controlling the trolling motor speed to between 1.5 to 3 mph.

34. The method of claim 1, wherein the step of identifying the at least one situational condition of the at least one first marine device comprises the step of receiving an initial SPECIES SELECT MODE selection from one of the fishfinder or mobile marine app, wherein the step of identifying the at least one second marine device comprises the step of identifying each of the marine devices and recording an operational status thereof, and wherein the step of triggering the situational control action for the at least one second marine device when the at least one situational condition for the at least one first marine device is met comprises the step of controlling each of the marine devices to operate in accordance with the recorded operational status thereof upon receipt of a subsequent SPECIES SELECT MODE selection from one of the fishfinder or mobile marine app.

35. The method of claim 1, wherein the step of identifying the at least one situational condition of the at least one first marine device comprises the step of receiving an EXTREME SPOT LOCK MODE selection from one of the fishfinder or mobile marine app, wherein the step of identifying the at least one second marine device comprises the step of identifying the trolling motor and the shallow water anchor, and wherein the step of triggering the situational control action for the at least one second marine device when the at least one situational condition for the at least one first marine device is met comprises the step of deploying the shallow water anchor, steering the trolling motor to provide thrust normal to the keel of the watercraft, and controlling the trolling motor speed to maintain an orientation of the watercraft.

36. The method of claim 35, wherein the step of controlling the trolling motor speed comprises the step of running the trolling motor in forward or reverse to maintain the orientation of the watercraft.

37. The method of claim 35, wherein the step of steering the trolling motor to provide thrust normal to the keel of the watercraft comprises the step of steering the trolling motor to 90° or 270° relative to the keel of the watercraft for turning the watercraft clockwise or counterclockwise to maintain the orientation of the watercraft about the shallow water anchor's anchor point.

38. The method of claim 35, wherein the step of controlling the trolling motor speed comprises the step of controlling the trolling motor speed to adjust the orientation of the watercraft around the shallow water anchor's anchor point.

39. The method of claim 1, wherein the step of identifying the at least one situational condition of the at least one first marine device comprises the step of identifying a bottom hardness from the fishfinder or other OBN devices, wherein the step of identifying the at least one second marine device comprises the step of identifying the shallow water anchor, and wherein the step of triggering the situational control action for the at least one second marine device when the at least one situational condition for the at least one first marine device is met comprises the step of controlling the anchoring force with which the shallow water anchor is deployed based on the bottom harness identified from the fishfinder or other OBN devices to deliver optimized anchoring force.

40. The method of claim 1, wherein the step of identifying the at least one situational condition of the at least one first marine device comprises the step of receiving an ADVANCED SPOT LOCK MODE selection from one of the fishfinder or mobile marine app, wherein the step of identifying the at least one second marine device comprises the step of identifying the trolling motor and the motor pod, and wherein the step of triggering the situational control action for the at least one second marine device when the at least one situational condition for the at least one first marine device is met comprises the step of controlling the trolling motor speed and direction to maintain the bow of the watercraft at a current location and controlling the motor pod speed and direction to maintain an orientation of the watercraft relative to the bow of the watercraft.

41. The method of claim 1, wherein the step of identifying the at least one situational condition of the at least one first marine device comprises the step of receiving an ADVANCED SPOT LOCK MODE selection from one of the fishfinder or mobile marine app, wherein the step of identifying the at least one second marine device comprises the step of identifying a bow mounted trolling motor and a stern mounted trolling motor, and wherein the step of triggering the situational control action for the at least one second marine device when the at least one situational condition for the at least one first marine device is met comprises the step of controlling the bow mounted trolling motor speed and direction to maintain the bow of the watercraft at a current location and controlling the stern mounted trolling motor speed and direction to maintain an orientation of the watercraft relative to the bow mounted trolling motor.

42. The method of claim 1, wherein the step of identifying the at least one situational condition of the at least one first marine device comprises the step of receiving a RIVER/CURRENT SPOT LOCK MODE selection from one of the fishfinder or mobile marine app and identifying activation of the foot pedal to control the trolling motor to move the watercraft, wherein the step of identifying the at least one second marine device comprises the step of identifying the trolling motor, and wherein the step of triggering the situational control action for the at least one second marine device when the at least one situational condition for the at least one first marine device is met comprises the step of suspending spot lock control of the trolling motor speed and direction to allow angler control of the trolling motor via the foot pedal, and re-engaging spot lock control of the trolling motor speed and direction to maintain the bow of the watercraft at a new location of the watercraft once activation of the foot pedal has ceased.

43. The method of claim 25, wherein the step of identifying a low battery condition by the fishfinder or other OBN devices comprises the steps of monitoring a voltage at the battery via the smart charger or power monitor, transmitting a value of the voltage at the battery to the fishfinder or other OBN devices, comparing the voltage to a low voltage threshold, and displaying by the fishfinder or other OBN devices a low battery condition message when the voltage is below the low voltage threshold.

44. The method of claim 43, wherein the trolling motor is a DC motor driven by an inverter that is controlled by a motor control board, further comprising the steps of monitoring a voltage and a current at the DC motor by the inverter, transmitting a value of the voltage at the DC motor and a value of the current to the fishfinder or other OBN devices, and displaying by the fishfinder or other OBN devices at least one of the value of the voltage at the battery, the value of the voltage at the DC motor, or the value of the current.

45. The method of claim 44, further comprising the steps of calculating a power dissipation from the battery to the DC motor and displaying by the fishfinder or other OBN devices a wiring issue warning when the power dissipation exceeds a threshold.

46. The method of claim 43, wherein the battery comprises a plurality of batteries, wherein the step of monitoring the voltage at the battery via the smart charger or power monitor comprises the step of monitoring the voltage at each of the plurality of batteries, wherein the step of transmitting the value of the voltage at the battery to the fishfinder or other OBN devices comprises the step of transmitting the value of the voltage at each of the plurality of batteries to the fishfinder or other OBN devices, wherein the step of comparing the voltage to the low voltage threshold comprises the step of comparing the voltage for each of the plurality of batteries to the low voltage threshold, and wherein the step of displaying by the fishfinder or other OBN devices a low battery condition message when the voltage is below the low voltage threshold comprises the step of displaying by the fishfinder or other OBN devices the low battery condition message when the voltage for any one of the plurality of batteries is below the low voltage threshold.

47. The method of claim 43, further comprising the step of receiving by the fishfinder or other OBN devices a battery type input, calculating an initial state of charge of the battery based at least on the battery type input and the value of the voltage at the battery when the trolling motor is not operating, and displaying the initial state of charge on the fishfinder or other OBN devices.

48. The method of claim 47, further comprising the steps of monitoring current flow from the battery, calculating an energy usage, calculating remaining state of charge as a reduction from the initial state of charge by the energy usage, and displaying the remaining state of charge on the fishfinder or other OBN devices.

49. The method of claim 48, further comprising the steps of calculating an average energy usage, projecting a remaining run time based on the remaining state of charge and the average energy usage, and displaying the remaining run time on the fishfinder or other OBN devices.

50. The method of claim 48, further comprising the steps of receiving a battery swap input and resetting the remaining state of charge to the initial state of charge.

51. The method of claim 44, further comprising the step of controlling the inverter to operate in quadrant II to provide regeneration of the battery when the trolling motor is driven by current flow.

52. A method of situationally controlling a speed of a trolling motor on a watercraft, comprising the steps of:
receiving a speed control input for the trolling motor from the foot pedal corresponding to an angler-set position;
receiving an input indicating that the foot pedal is being activated to turn on the trolling motor to move the watercraft;
receiving a trolling motor mode control input;
situationally controlling energization of the trolling motor based on the speed control input and the trolling motor mode control input.

53. The method of claim 52, wherein the step of receiving the trolling motor mode control input comprises the step of identifying that a heading sensor of the trolling motor indicates that the trolling motor is pointed at an angle relative to a keel of the watercraft, and wherein the step of situationally controlling energization of the trolling motor based on the speed control input and the trolling motor mode control input comprises the step of controlling a ramp up of the speed of the trolling motor to reduce a risk of an angler losing balance.

54. The method of claim 52, wherein the step of receiving the trolling motor mode control input comprises the step of receiving an ECO MODE selection from one of a fishfinder or a mobile marine app, and wherein the step of situationally controlling energization of the trolling motor based on the speed control input and the trolling motor mode control input comprises the step of allocating only a middle portion of an available speed band for the trolling motor, indexing the allocated portion to the speed control input for the trolling motor on the foot pedal, and controlling the speed of the trolling motor based on the allocated portion of the speed band indexed to the angler-set position.

55. The method of claim 52, wherein the step of receiving the trolling motor mode control input comprises the step of identifying a low battery condition by the fishfinder or other OBN devices, and wherein the step of situationally controlling energization of the trolling motor based on the speed control input and the trolling motor mode control input comprises the step of allocating only a bottom portion of an available speed band for the trolling motor, indexing the allocated portion to the speed control input for the trolling motor on the foot pedal, and controlling the speed of the trolling motor based on the allocated portion of the speed band indexed to the angler-set position.

56. The method of claim 52, wherein the step of receiving the trolling motor mode control input comprises the step of receiving a BEAST MODE selection from one of the fishfinder or mobile marine app, and wherein the step of situationally controlling energization of the trolling motor based on the speed control input and the trolling motor mode control input comprises the step of allocating only a top portion of an available speed band for the trolling motor, indexing the allocated portion to the speed control input for the trolling motor on the foot pedal, and controlling the speed of the trolling motor based on the allocated portion of the speed band indexed to the angler-set position.

57. The method of claim 52, wherein the step of receiving the trolling motor mode control input comprises the step of receiving a DEEP WEEDS MODE selection from one of the fishfinder or mobile marine app, and wherein the step of situationally controlling energization of the trolling motor based on the speed control input and the trolling motor mode control input comprises the step of disabling a soft start speed ramp up function for the trolling motor to allow the trolling motor to achieve the speed corresponding to the angler-set position as quickly as possible.

58. The method of claim 52, wherein the step of receiving the trolling motor mode control input comprises the step of receiving a CUSTOM SPEED MODE selection from one of the fishfinder or mobile marine app, and wherein the step of situationally controlling energization of the trolling motor based on the speed control input and the trolling motor mode control input comprises the step of allocating an angler selected portion of an available speed band for the trolling motor, indexing the allocated portion to the speed control input for the trolling motor on the foot pedal, and controlling the speed of the trolling motor based on the allocated portion of the speed band indexed to the angler-set position.

59. The method of claim 58, wherein the step of allocating an angler selected portion of an available speed band for the trolling motor comprises the step of allocating an entirety of the available speed band for the trolling motor to be indexed in overlapping ranges for each angler-set position of the speed control input for the trolling motor on the foot pedal.

60. The method of claim 58, wherein the step of allocating an angler selected portion of an available speed band for the trolling motor comprises the step of allocating portions of the available speed band for the trolling motor to be indexed to multiple angler-set positions of the speed control input for the trolling motor on the foot pedal.

61. The method of claim 58, wherein the step of allocating an angler selected portion of an available speed band for the trolling motor comprises the step of selecting a specific trolling motor speed to be indexed to each angler-set positions of the speed control input for the trolling motor on the foot pedal.

62. The method of claim 52, wherein the step of receiving the trolling motor mode control input comprises the step of identifying that the downriggers are set to a depth of between fifteen and forty feet, and that temperature at depth sensors indicate water temperature of between approximately forty to sixty-five degrees, and wherein the step of situationally controlling energization of the trolling motor based on the speed control input and the trolling motor mode control input comprises the step of controlling the trolling motor speed to between 1.5 to 3 mph.

63. The method of claim 52, wherein the step of receiving the trolling motor mode control input comprises the step of receiving an initial SPECIES SELECT MODE selection from one of the fishfinder or mobile marine app, further comprising the step of recording an operational status of the trolling motor upon receipt of the initial SPECIES SELECT MODE selection from one of the fishfinder or mobile marine app, and wherein the step of situationally controlling energization of the trolling motor based on the speed control input and the trolling motor mode control input comprises the step of controlling the trolling motor to operate in accordance with the recorded operational status thereof upon receipt of a subsequent SPECIES SELECT MODE selection from one of the fishfinder or mobile marine app.

64. A method of situationally anchoring a watercraft having at least one of a bow mount trolling motor, a shallow water anchor, a stern mount trolling motor, or a stern mount motor pod, comprising the steps of:
receiving an anchoring mode control input;
situationally controlling utilization of at least one of the bow mount trolling motor, the shallow water anchor, the stern mount trolling motor, or the stern mount motor pod based on the anchoring mode control input.

65. The method of claim 64, wherein the step of receiving an anchoring mode control input comprises the step of receiving an EXTREME SPOT LOCK MODE selection from one of the fishfinder or mobile marine app, and wherein the step of situationally controlling utilization of at least one of the bow mount trolling motor, the shallow water anchor, the stern mount trolling motor, or the stern mount motor pod based on the anchoring mode control input comprises the step of deploying the shallow water anchor, steering the trolling motor to provide thrust normal to the keel of the watercraft, and controlling the trolling motor speed to maintain an orientation of the watercraft.

66. The method of claim 65, wherein the step of controlling the trolling motor speed comprises the step of running the trolling motor in forward or reverse to maintain the orientation of the watercraft.

67. The method of claim 65, wherein the step of steering the trolling motor to provide thrust normal to the keel of the watercraft comprises the step of steering the trolling motor to 90° or 270° relative to the keel of the watercraft for turning the watercraft clockwise or counterclockwise to maintain the orientation of the watercraft about the shallow water anchor's anchor point.

68. The method of claim 65, wherein the step of controlling the trolling motor speed comprises the step of controlling the trolling motor speed to adjust the orientation of the watercraft around the shallow water anchor's anchor point.

69. The method of claim 64, wherein the step of receiving an anchoring mode control input comprises the step of identifying a bottom hardness from the fishfinder or other OBN devices, and wherein the step of situationally controlling utilization of at least one of the bow mount trolling motor, the shallow water anchor, the stern mount trolling motor, or the stern mount motor pod based on the anchoring mode control input comprises the step of controlling the anchoring force with which the shallow water anchor is deployed based on the bottom harness identified from the fishfinder or other OBN devices to deliver optimized anchoring force.

70. The method of claim 64, wherein the step of receiving an anchoring mode control input comprises the step of receiving an ADVANCED SPOT LOCK MODE selection from one of the fishfinder or mobile marine app, and wherein the step of situationally controlling utilization of at least one of the bow mount trolling motor, the shallow water anchor, the stern mount trolling motor, or the stern mount motor pod based on the anchoring mode control input comprises the step of controlling the trolling motor speed and direction to maintain the bow of the watercraft at a current location and controlling the motor pod speed and direction to maintain an orientation of the watercraft relative to the bow of the watercraft.

71. The method of claim 64, wherein the step of receiving an anchoring mode control input comprises the step of receiving an ADVANCED SPOT LOCK MODE selection from one of the fishfinder or mobile marine app, and wherein the step of situationally controlling utilization of at least one of the bow mount trolling motor, the shallow water anchor, the stern mount trolling motor, or the stern mount motor pod based on the anchoring mode control input comprises the step of controlling the bow mounted trolling motor speed and direction to maintain the bow of the watercraft at a current location and controlling the stern mounted trolling motor speed and direction to maintain an orientation of the watercraft relative to the bow mounted trolling motor.

72. The method of claim 64, wherein the step of receiving an anchoring mode control input comprises the step of receiving a RIVER/CURRENT SPOT LOCK MODE selection from one of the fishfinder or mobile marine app, and wherein the step of situationally controlling utilization of at least one of the bow mount trolling motor, the shallow water anchor, the stern mount trolling motor, or the stern mount motor pod based on the anchoring mode control input comprises the step of suspending spot lock control of the trolling motor speed and direction to allow angler control of the trolling motor via a foot pedal, and re-engaging spot lock control of the trolling motor speed and direction to maintain the bow of the watercraft at a new location of the watercraft once activation of the foot pedal has ceased.

73. A method of power management for a watercraft having a networked smart battery charger or power monitor, fishfinder or other OBN devices, and trolling motor, and at least one battery for supplying power to the trolling motor, comprising the steps of:
monitoring a voltage at the at least one battery via the smart charger or power monitor,
transmitting a value of the voltage at the battery to the fishfinder or other OBN devices;
comparing the voltage to a low voltage threshold; and
displaying by the fishfinder or other OBN devices a low battery condition message when the voltage is below the low voltage threshold.

74. The method of claim 73, wherein the trolling motor is a DC motor driven by an inverter that is controlled by a motor control board, further comprising the steps of monitoring a voltage and a current at the DC motor by the inverter, transmitting a value of the voltage at the DC motor and a value of the current to the fishfinder or other OBN devices, and displaying by the fishfinder or other OBN devices at least one of the value of the voltage at the battery, the value of the voltage at the DC motor, or the value of the current.

75. The method of claim 74, further comprising the steps of calculating a power dissipation from the battery to the DC motor and displaying by the fishfinder or other OBN devices a wiring issue warning when the power dissipation exceeds a threshold.

76. The method of claim 73, wherein the battery comprises a plurality of batteries, wherein the step of monitoring the voltage at the battery via the smart charger or power monitor comprises the step of monitoring the voltage at each of the plurality of batteries, wherein the step of transmitting the value of the voltage at the battery to the fishfinder or other OBN devices comprises the step of transmitting the value of the voltage at each of the plurality of batteries to the fishfinder or other OBN devices, wherein the step of comparing the voltage to the low voltage threshold comprises the step of comparing the voltage for each of the plurality of batteries to the low voltage threshold, and wherein the step of displaying by the fishfinder or other OBN devices a low battery condition message when the voltage is below the low voltage threshold comprises the step of displaying by the fishfinder or other OBN devices the low battery condition message when the voltage for any one of the plurality of batteries is below the low voltage threshold.

77. The method of claim 73, further comprising the step of receiving by the fishfinder or other OBN devices a battery type input, calculating an initial state of charge of the battery based at least on the battery type input and the value of the voltage at the battery when the trolling motor is not operating, and displaying the initial state of charge on the fishfinder or other OBN devices.

78. The method of claim 77, further comprising the steps of monitoring current flow from the battery, calculating an energy usage, calculating remaining state of charge as a reduction from the initial state of charge by the energy usage, and displaying the remaining state of charge on the fishfinder or other OBN devices.

79. The method of claim 78, further comprising the steps of calculating an average energy usage, projecting a remaining run time based on the remaining state of charge and the average energy usage, and displaying the remaining run time on the fishfinder or other OBN devices.

80. The method of claim 78, further comprising the steps of receiving a battery swap input and resetting the remaining state of charge to the initial state of charge.

81. The method of claim 74, further comprising the step of controlling the inverter to operate in quadrant II to provide regeneration of the battery when the trolling motor is driven by current flow.

82. The method of claim 77, further comprising the steps of transmitting by the smart battery charger a state of charging process, calculating by the fishfinder or other OBN devices a time remaining to achieve a full state of charge.

83. The method of claim 73, further comprising the steps of transmitting by the smart battery charger a state of connection of an external AC input, displaying by the fishfinder or other OBN devices the state of connection of the external AC input.

84. The method of claim 73, further comprising the step of disabling motor functionality when the step of comparing the voltage to the low voltage threshold indicates that the voltage is below a normal operation voltage threshold in order to maintain predictable operation of the motor.

85. The method of claim 25, wherein the step of identifying a low battery condition by the fishfinder or other OBN devices comprises the steps of monitoring a voltage at the battery via the smart charger or power monitor, transmitting a value of the voltage at the battery to the fishfinder or other OBN devices, comparing the voltage to a low voltage threshold, and disabling motor functionality when the step of comparing the voltage to the low voltage threshold indicates that the voltage is below a normal operation voltage threshold in order to maintain predictable operation of the motor.

* * * * *